United States Patent
Hongo et al.

(10) Patent No.: US 8,305,533 B2
(45) Date of Patent: Nov. 6, 2012

(54) LIQUID CRYSTAL DISPLAY DEVICE

(75) Inventors: Koki Hongo, Osaka (JP); Kazuyoshi Fujioka, Osaka (JP); Katsuya Ogawa, Osaka (JP); Tomoo Furukawa, Osaka (JP); Masaaki Saitoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 341 days.

(21) Appl. No.: 12/863,069

(22) PCT Filed: Oct. 21, 2008

(86) PCT No.: PCT/JP2008/069044
§ 371 (c)(1),
(2), (4) Date: Jul. 15, 2010

(87) PCT Pub. No.: WO2009/101732
PCT Pub. Date: Aug. 20, 2009

(65) Prior Publication Data
US 2011/0043438 A1    Feb. 24, 2011

(30) Foreign Application Priority Data

Feb. 15, 2008    (JP) .................................. 2008-034406

(51) Int. Cl.
*G02F 1/1337* (2006.01)
(52) U.S. Cl. ...................................................... 349/129
(58) Field of Classification Search .................... 349/129
See application file for complete search history.

(56) References Cited

U.S. PATENT DOCUMENTS

| | | |
|---|---|---|
| 6,661,488 B1 | 12/2003 | Takeda |
| 6,724,452 B1 | 4/2004 | Takeda |
| 7,167,224 B1 | 1/2007 | Takeda |
| 7,224,421 B1 | 5/2007 | Takeda |
| 7,304,703 B1 | 12/2007 | Takeda |
| 2004/0119924 A1 | 6/2004 | Takeda |
| 2005/0128396 A1 | 6/2005 | Tsuchiya |
| 2007/0024785 A1 | 2/2007 | Tsuchiya |
| 2007/0064187 A1 | 3/2007 | Takeda |
| 2007/0211187 A1 | 9/2007 | Misaki |
| 2008/0165314 A1 | 7/2008 | Takeda |
| 2008/0303997 A1 | 12/2008 | Takeda |
| 2009/0122245 A1 | 5/2009 | Misaki |
| 2009/0207360 A1 | 8/2009 | Takeda |

FOREIGN PATENT DOCUMENTS

| | | |
|---|---|---|
| EP | 2 131 232 | 12/2009 |
| JP | 11-258606 | 9/1999 |
| JP | 2006-58734 | 3/2006 |
| JP | 2006-201356 | 8/2006 |
| WO | 2008/129734 | 10/2008 |

OTHER PUBLICATIONS

International Search Report for PCT/JP2008/069044, mailed Jan. 20, 2009.

*Primary Examiner* — Phu Vu
(74) *Attorney, Agent, or Firm* — Nixon & Vanderhye, P.C.

(57) ABSTRACT

The present invention provides an MVA transmissive or transflective liquid crystal display device with display qualities enhanced along with improvement in contrast.
A liquid crystal display device of the present invention including:
  a pair of substrates; and
  a liquid crystal layer disposed between the pair of substrates,
  wherein one of the pair of substrates includes a pixel electrode having a rectangular shape when viewed from a display face side,
  the other substrate includes a linear-shaped dielectric protrusion overlapping with a corner portion of the pixel electrode when viewed from the display face side, and
  at least one of the pair of substrates includes a corner light-shielding member overlapping with a region where the linear-shaped dielectric protrusion and the corner portion of the pixel electrode overlap with each other.

14 Claims, 18 Drawing Sheets

(a)

(b)

(a)

(b)

(a)

(b)

(a)

(b)

(a)

(b)

(a)

(b)

(a)

(b)

(a)

(b)

(a)

(b)

LIQUID CRYSTAL DISPLAY DEVICE

This application is the U.S. national phase of International Application No. PCT/JP2008/069044, filed 21 Oct. 2008, which designated the U.S. and claims priority to Japanese Patent Application No. 2008-034406, filed 15 Feb. 2008, the entire contents of each of which are hereby incorporated by reference.

TECHNICAL FIELD

The present invention relates to a liquid crystal display device. More particularly, the present invention relates to a transmissive or transflective liquid crystal display device preferably used in mobile devices such as a cellular phone.

BACKGROUND ART

Liquid crystal display devices are display devices which control alignment of liquid crystal molecules by using an electric field formed between electrodes, thereby controlling ON and OFF of liquid crystal display. According to common LCD devices, electrodes for applying a voltage to LC molecules are pattern-formed in a specific shape and size, and the electrodes as a pixel unit drive and control the LC molecules. Thus the LCD devices can provide high-definition display.

LCD devices are classified into transmissive LCD devices and reflective LCD devices based on the kind of display light. The transmissive LCD devices include a light source such as a backlight and use light from the light source as display light. The reflective LCD devices include a reflector and use ambient light reflected by the reflector as display light. In recent years, transflective LCD devices which can provide both transmissive display and reflective display have attracted attention. The transflective LCD devices can provide mainly transmissive display under indoor environments and mainly reflective display under outdoor environments. So the transflective LCD devices can provide high quality display under any environments, both indoor and outdoor environments. The transflective LCD devices are installed in various mobile equipment, such as a cellular phone, a PDA, and a digital camera.

VA (vertical alignment) LCD devices are commonly used as one of the LCD devices. In the VA LCD devices, display is controlled by aligning LC molecules vertically to substrate surfaces in a voltage-off state and aligning the LC molecules in a direction parallel to the substrate surfaces in a voltage-on state. The VA LCD devices typically show a high contrast ratio, which shows luminance of white state and black state, and also shows a wide viewing angle by aligning LC molecules in various directions in one pixel. MVA (multi-domain vertical alignment) LCD devices and CPA (continuous pinwheel alignment) LCD devices are known as one of the VA LCD devices allowing alignment division more effective in wide viewing angle. In the MVA LCD devices, a linear-shaped dielectric protrusion is formed on a substrate surface facing a liquid crystal layer, or a slit is provided for a pixel electrode. In the CPA LCD devices, dielectric protrusions are formed in a dotted pattern on a substrate surface facing a liquid crystal layer of a pixel electrode, and distortion of an electric field created between the dielectric protrusions and edges is utilized.

When alignment control structures, such as the protrusion and the slit, are arranged, LC molecules around the structures are in an alignment state different from that of LC molecules in other regions. This might cause light leakage when a voltage is applied, leading to a reduction in contrast. In order to improve the contrast by suppressing such light leakage, Patent Document 1 discloses, for example, a CPA LCD device that permits high contrast display by shielding a region overlapping with the alignment control structures as viewed in plane.

In VA LCD devices, transmittance in oblique directions less depends on a driving voltage, which results in deterioration of color reproducibility. In order to improve display characteristics of the VA LCD devices, a control capacitance electrode is provided to form a plurality of regions different in capacitance in a pixel. However, such a control capacitance electrode is made of a light blocking metal film, and therefore an aperture ratio of the pixel is decreased and luminance is reduced. In order to improve the aperture ratio of a pixel, Patent Document 2 discloses that, for example, part of a control capacitance electrode is arranged to overlap with a region where a linear-shaped protrusion is formed and light transmittance is lower than that of other regions.

The LCD devices are now being rapidly developed. Simple methods for a further improvement in display qualities are strongly needed.

[Patent Document 1]
    Japanese Kokai Publication No. 2006-58734
[Patent Document 2]
    Japanese Kokai Publication No. 2006-201356

DISCLOSURE OF INVENTION

The present invention has been made in view of the above-mentioned state of the art. The present invention has an object to provide an MVA transmissive or transflective liquid crystal display device with display qualities enhanced along with improvement in contrast.

The present inventors made various investigations on a further improvement in display qualities of MVA LCD devices.

The inventors noted a light-shielding member arranged to overlap with an alignment control structure in MVA LCD devices, specifically, a linear-shaped dielectric protrusion. The inventors found that a dielectric protrusion placed to overlap with a corner portion of a pixel electrode is not sufficiently considered previously because the protrusion has a relatively small affect on display qualities. The inventors also found that a contrast ratio can be further improved by arranging a light-shielding member to overlap with the dielectric protrusion overlapping with the corner portion of the pixel electrode. Thus, the above-mentioned problems have been admirably solved, leading to completion of the present invention.

That is, the present invention is a liquid crystal display device, comprising:
    a pair of substrates; and
    a liquid crystal layer disposed between the pair of substrates,
    wherein one of the pair of substrates includes a pixel electrode having a rectangular shape when viewed from a display face side,
    the other substrate includes a linear-shaped dielectric protrusion overlapping with a corner portion of the pixel electrode when viewed from the display face side, and
    at least one of the pair of substrates includes a corner light-shielding member overlapping with a region where the linear-shaped dielectric protrusion and the corner portion of the pixel electrode overlap with each other.

The LCD device of the present invention is mentioned below in more detail.

The liquid crystal display device of the present invention includes a pair of substrates and a liquid crystal layer disposed between the pair of substrates. One of the pair of substrates includes a pixel electrode having a rectangular shape when viewed from a display face side. A region where the pixel electrode is formed is used for driving and controlling liquid crystals, and the region constitutes a display region. The size and the number of the pixel electrode are not limited and a plurality of the pixel electrodes is typically provided in the display region. Higher definition display is achieved with an increase in the number of the pixel electrode and with a decrease in the size of the pixel electrode. The pixel electrode of the present invention has a rectangular shape and the plurality of the pixel electrodes may be efficiently arranged in a matrix pattern or a delta pattern. In the present description, the rectangular shape means a shape substantially formed in a rectangle. The rectangle may have short and long sides perpendicular to each other, and partially have a convex or concave portion.

In the present invention, the other substrate includes a linear-shaped dielectric protrusion overlapping with a corner portion of the pixel electrode when viewed from the display face side. Therefore, the LCD device of the present invention is an MVA LCD device including a pixel electrode and a dielectric protrusion in different substrates. The dielectric protrusion is a structure having a protruded shape and is formed of a dielectric material. The dielectric protrusion arranged in a linear shape (in a band pattern) can align liquid crystal molecules horizontally to each other and towards the protrusion. Therefore, for example, the dielectric protrusion arranged in an oblique direction relative to the long and short sides of the rectangular pixel electrode can align LC molecules in an oblique direction relative to the long and short side thereof. When the dielectric protrusions are arranged to extend across one pixel electrode, the pixel electrode has a plurality of regions (domains). The dielectric protrusion may have a bended or branched portion as long as it has a linear shape when the entire display face is viewed. Thus, a wide viewing angle can be achieved in the LCD device of the present invention.

The dielectric protrusion overlaps with a corner portion of the pixel electrode when viewed from the display face. When two or more of the dielectric protrusions are provided, at least one of them overlaps with the corner portion of the pixel electrode. As used herein, the term "corner portion of pixel electrode" means a portion positioned at four corners of the rectangular pixel electrode, more particularly, a portion within a distance of half the short side of the pixel electrode from a vertex. The dielectric protrusion overlapping with the corner portion of the pixel electrode needs to have half or more of its area in the corner portion. Therefore, for example, when the dielectric protrusion is arranged in an oblique direction relative to each side of the rectangular pixel electrode, the pixel electrode appears to be chipped at the corner portion when viewed from the display face side.

At least one of the pair of substrates includes a corner light-shielding member overlapping with a region where the linear-shaped dielectric protrusion and the corner portion of the pixel electrode overlap with each other. The light-shielding member is formed overlapping with the region where the linear-shaped dielectric protrusion and the corner portion of the pixel electrode overlap with each other, thereby suppressing light leakage in a black state. As a result, a contrast ratio, i.e., a value of "transmittance in a white state/transmittance in a black state" is increased, and display qualities are further improved. It is sufficient that the light-shielding member is formed to overlap with at least one of the dielectric protrusions, which overlaps with one of the four corner portions of the pixel electrode, and more preferably formed to overlap with all of the dielectric protrusions at corner portions. The light-shielding member may not be necessarily completely overlap with the dielectric protrusion and may have a portion not overlapping with the dielectric protrusion as long as effects of the present invention can be provided.

The configuration of the LCD device of the present invention is not particularly limited as long as the above-mentioned components are essentially included. The LCD device may or may not include other components.

In the present invention, when the dielectric protrusion is arranged to also overlap with a portion other than the corner portion of the pixel electrode, the light-shielding member is preferably arranged to overlap with such a protrusion. As a result, a contrast ratio is increased. Hereinafter, the light-shielding member arranged to overlap with the dielectric protrusion overlapping with the portion other than the corner portion of the pixel electrode, i.e., the dielectric protrusion having half or more of its area in the portion other than the corner portion of the pixel electrode is also referred to as a main light-shielding member. Therefore, it is preferred that at least one of the pair of substrates includes a linear-shaped dielectric protrusion overlapping with a portion other than the corner portion of the pixel electrode, and a main light-shielding member overlapping with a region where the linear-shaped dielectric protrusion overlaps with the portion other than the corner portion of the pixel electrode.

The light-shielding member used in the present invention is not particularly limited as long as the member has a light-shielding property, and may be made of an organic resin, a metal, or the like. When such a light-shielding member also has a light-reflecting property, transflective LCD devices in which light reflected by the member can be used as display light can be provided. As used herein, the phrase "has a light-shielding property" means that at least 50% of incident light is blocked. The light-shielding member used in the present invention preferably blocks 90% or more of incident light. Therefore, the LCD device of the present invention is applicable to both the transmissive and transflective LCD device. When the LCD of the present invention is used as the transflective LCD device, it is preferred that the main light-shielding member reflects light incident from the display face. Further, it is preferred that the corner light-shielding member reflects light incident from the display face. As used herein, the term "reflect" means that at least 50% of incident light is reflected (reflectance of 50%). The light-shielding member used in the present invention preferably reflects 90% or more of incident light (reflectance of 90%). It is preferred that both the main light-shielding member and the corner light-shielding member reflect light incident from the display face. This allows further increases in reflectance. When used as a transflective LCD device, the LCD device of the present invention preferably includes a $\lambda/4$ retarder which gives a phase difference of $\lambda/4$ (95 to 195 nm) of visible wavelengths (380 to 780 nm) to display light to convert linearly polarized light into circularly polarized light.

A width of the main light-shielding member is larger than a width of the dielectric protrusion. A width of the corner light-shielding member is larger than a width of the dielectric protrusion. In particular, it is preferred that each of the main light-shielding member and the corner light-shielding member has a width larger than that of the dielectric protrusion. According to such a configuration, even if misalignment occurs between the dielectric protrusion and the light-shielding member, an effect of shielding light can be sufficiently obtained. In the present description, the width means a size in a transverse direction with respect to the longitudinal direction of the linear shape. In the present description, the length means a size in the longitudinal direction of the linear shape.

It is preferred that the main light-shielding member and the corner light-shielding member are constituted by a pixel driving line. In the present description, the pixel driving line is not particularly limited as long as it is used for driving pixels. Examples thereof include a scanning line, a signal line, a storage capacitor line (CS line), a drawing line extended from a thin film transistor (TFT). The pixel driving line is usually made of a reflective material with a light-shielding property. Use of such a line can simplify the device configuration.

It is preferred that the pixel driving line is a storage capacitor line. The CS line is usually provided to overlap with the pixel electrode, and therefore easily overlaps with the dielectric protrusion which is arranged to overlap with the pixel electrode. Electrostatic capacitance is formed in a region where the CS line and the dielectric protrusion overlap with each other. Effective use of the capacitance eliminates the need to form additional CS lines in other regions. As a result, an aperture ratio is improved.

It is preferred that the pixel driving line is a drawing line extended from a thin film transistor. In the present description, the drawing line is a line extended from a source or drain electrode of the TFT. For example, the drawing line is used for forming capacitance together with the CS line arranged adjacent to the drawing line with an insulating film therebetween. The drawing line is also usually provided to overlap with the pixel electrode and easily overlaps with the dielectric protrusion which is arranged to overlap with the pixel electrode. By use of the drawing line, a light shielding range can be adjusted without taking into consideration electric designs such as electrostatic capacitance and applied voltage.

When the main light-shielding member and the corner light-shielding members are constituted by the pixel driving line, it is preferred that the main light-shielding member and the corner light-shielding member are electrically connected to each other through a conductive bridge. If the light-shielding member is made of a conductive material, such as metals, and if the conductive films arranged to overlap with a corner portion and a portion other than the corner portion of the pixel electrode are not electrically connected to and isolated from each other, static electricity, which is unexpectedly generated in LCD device, charged in either one of the conductive films is not discharged and might provide irregular alignment to LC molecules. Particularly, the corner light-shielding member tends to be largely influenced by the static electricity because the member has a small area. Therefore, if the corner light-shielding member is connected to the pixel driving line through a conductive bridge, the electricity can be discharged through the pixel driving line, which reduces influences on alignment of LC molecules.

When forming the conductive bridge, it is preferred that the pixel electrode is provided with a linear-shaped slit when viewed from the display face side, the main light-shielding member and the corner light-shielding member are provided in the substrate including the pixel electrode, the conductive bridge and the pixel electrode are disposed indifferent layers with an interlayer insulating film therebetween, and the conductive bridge extends across the linear-shaped slit. In such a configuration, response characteristics of LC molecules to ON and OFF is improved, which prevents occurrence of an afterimage. Hereafter, the principle is described.

Similarly to the dielectric protrusion, the linear-shaped slit provided in the pixel electrode can align LC molecules horizontally to each other towards the slit. However, such alignment of the LC molecules tilted towards the linear-shaped slit and horizontally to each other are affected by adjacent LC molecules and is gradually changed with time Therefore, if an aspect ratio (long side of the slit/short side of the slit), i.e., a length (longitudinal direction) of the linear-shaped slit is too large, or if a width (transverse direction) of the slit is too small, response characteristics are reduced, which may cause an afterimage. As a result of investigations by the present inventors, it has been found that it is possible to prevent such a reduction in response characteristics by the following configuration. The configuration is that the conductive bridge is arranged to extend across a linear-shaped slit when viewed from the display face side and the conductive bridge and the pixel electrode are provided in different layers with an interlayer insulating film therebetween. In such a configuration, leakage of an electric field around the conductive bridge can intentionally change the shape of equipotential lines in the electric field by forming an equipotential line along the conductive bridge, thereby causing a border line of alignment of LC molecules. As a result, the response characteristics can be improved. As mentioned above, the present inventors found that response speed can be improved by the thus-arranged conductive bridge without changing a design of the linear-shaped slit. Such features can be applied to configurations that are different from a configuration in which the liquid crystal display device includes a light-shielding member that is provided to overlap with a dielectric protrusion overlapped with a corner of a pixel electrode.

That is, the present invention a liquid crystal display device, comprising:
a pair of substrates;
a liquid crystal layer disposed between the pair of substrates; and
a conductive bridge,
wherein one of the pair of substrates includes a pixel electrode provided with a linear-shaped slit when viewed from a display face side,
the conductive bridge and the pixel electrode are disposed in different layers with an interlayer insulating film therebetween, and
the conductive bridge extends across the linear-shaped slit.

The size of the conductive bridge is not particularly limited. In order to increase an aperture ratio, the conductive bridge preferably has a small width unless disconnection occurs. The number of the conductive bridge is not particularly limited and preferably depends on the linear-shaped slit length. In order to increase an aperture ratio and provide uniform alignment, the conductive bridge is preferably arranged in a direction perpendicular to the dielectric protrusion.

The conductive bridge is arranged not to electrically isolate the conductive film that is arranged to overlap with the corner portion of the pixel electrode as a light-shielding member, and further arranged to extend across the linear-shaped slit formed in the pixel electrode. As a result, contrast is improved and an effect of improving response characteristics can be provided. Thus, the combination of features of the present invention significantly improves display qualities.

It is preferred that the conductive bridge extends across the middle portion of the linear-shaped slit. As mentioned above, change of alignment of the LC molecules can be created by arrangement of the conductive bridge. In order to align the LC molecules more uniform, the conductive bridge is preferably arranged to overlap with the middle portion of the linear-shaped slit arranged. Thus, reliability of the response speed improvement is increased.

Effect of the Invention

According to the liquid crystal display device of the present invention, the light-shielding member is arranged to overlap with a region where the dielectric protrusion and the corner portion of the pixel electrode overlap with each other, and thus the contrast ratio can be improved.

BEST MODES FOR CARRYING OUT THE INVENTION

The present invention is mentioned in more detail below with reference to Embodiments using drawings, but not limited thereto.

Embodiment 1

FIG. 1 is a plan view schematically showing a pixel constituting the display face of the liquid crystal display device in accordance with Embodiment 1. As shown in FIG. 1, the pixel constituting the display face of the LCD device of Embodiment 1 has a rectangular shape and a plurality of pixels arranged in a matrix pattern or a delta pattern constitute one display face. In Embodiment 1, the number of the pixels is not limited.

FIG. 2 is a cross-sectional view schematically showing a substrate configuration of the liquid crystal display device in accordance with Embodiment 1, taken along line A-B in FIG. 1. As shown in FIG. 2, the LCD device of Embodiment 1 includes a pair of substrates, that is, an array substrate 1 and a color filter substrate 2, and an LC layer 3 disposed between the substrates. The array substrate 1, the LC layer 3, and the color filter substrate 2 are disposed in this order toward the display face. Nematic liquid crystals with negative dielectric anisotropy constitute the LC layer 3. A vertical alignment film is formed on the LC layer 3 side-surfaces of the array substrate 1 and the color filter substrate 2. Therefore the LCD device of Embodiment 1 is a VA LCD device and LC molecules 31 are vertically aligned to the substrates when no voltage is applied. A polarizer is provided on a rear side of the array substrate 1 and a display face side of the color filter substrate 2 so that absorption axes of these two polarizers are perpendicular to each other. Thus, the LCD device of Embodiment 1 is configured to be operated in normally black mode where black display is provided when no voltage is applied.

The color filter substrate 2 is described. As shown in FIG. 2, in Embodiment 1, the color filter substrate 2 includes a glass substrate 21, a color filter layer 22, a common electrode 23, and a dielectric protrusion (hereinafter, also referred to as a "rib") 24, stacked in this order toward the LC layer 3. The dielectric protrusion 24 has a linear shape when viewed from a display face side. The color filter layer 22 is composed of an organic resin and respective colors are composed of a material containing a pigment, such as a red pigment, a green pigment, and a blue pigment. A black matrix composed of a black pigment-containing material is formed between each two of the colors. The black matrix prevents the colors from mixing and prevents light leakage, and the like. The common electrode 23 is formed over the surface of the color filter substrate 2 and is used for applying a specific voltage to the LC layer 3 together with the pixel electrode 15 that is included in the array substrate 1. A metal oxide film having transparency, such as ITO (indium tin oxide), IZO (indium zinc oxide), and the like, is preferably used as a material for the common electrode 23. The rib 24 is composed of an insulating organic resin and aligns the LC molecules 31 in the vicinity of the rib 24 theretowards. In Embodiment 1, the rib 24 protrudes in a pyramid shape toward the LC layer 3 and has a triangle cross section, but may have a columnar shape or a mountain shape having a curved surface as long as the rib 24 protrudes towards the LC layer. Examples of the cross section of the rib 24 include a rectangle, trapezoid, and mountain shape forming a parabola.

The array substrate 1 is described. As shown in FIG. 2, in Embodiment 1, the array substrate 1 includes a glass substrate 11, a pixel driving line 12 and a thin film transistor (TFT) 13 as a switching element, an interlayer insulating film 14, and a pixel electrode 15 stacked in this order toward the LC layer 3. In Embodiment 1, examples of the pixel driving line 12 include a gate line 41, a source line 42, a storage capacitor line (CS line) 43, and a drain-drawing line 44 extended from the TFT. As shown in FIG. 1, in Embodiment 1, the array substrate 1 includes the gate lines 41 and the source lines 42 arranged perpendicular to each other. The TFT 13 is arranged at each intersection of these gate lines 41 and source lines 42. The gate line 41 can feed a gate signal into the TFT 13 and the source line 42 can feed a source signal into the pixel electrode 15 through the TFT 13. The rectangular pixel electrodes 15 are formed in a matrix pattern in regions defined by the gate line 41 and the source line 42. The interlayer insulating film 14 composed of a first interlayer insulating film 14a and a second interlayer insulating film 14b is disposed between the pixel electrode 15, and the gate line 41 and the source line 42. A region including one pixel electrode 15 corresponds to one pixel region. In Embodiment 1, the drain-drawing line 44 extended from the TFT 13 reaches to the center of a pixel, and at the center of the pixel, the drain-drawing line 44 and the pixel electrode 15 are connected to each other through a contact hole 16. Thus every pixel is individually controlled by one TFT 13 formed therein. The contact hole 16 is formed in the second interlayer insulating film 14b. In the present Embodiment, the CS line 43 is arranged to pass through the center of the pixel electrode 15 and in parallel with the gate line 41. The CS line 43 is provided to overlap with the drain-drawing line 44 with the first interlayer insulating film 14a therebetween, and a specific electrostatic capacitance is created between the drain-drawing line 44 and the CS line 43.

As shown in FIG. 1, in Embodiment 1, the color filter substrate 2 includes the ribs 24 for aligning the LC molecules 31 in a specific direction. The ribs 24 each have a linear shape and overlap with the pixel electrode 15, when viewed from the display face side. Specifically, in Embodiment 1, the ribs 24 are arranged in a direction at an angle of about 45° with respect to the respective sides of the pixel electrode 15. One of the ribs 24 has a bent portion. The bent rib has a V-shape when the each pixel is viewed in plan. Another one of the ribs 24 has a linear shape. The linear-shaped rib is arranged to overlap with a corner portion of the pixel electrode 15. The part circled by the dotted line in FIG. 1 is the corner portion 10 of the pixel electrode 15. In Embodiment 1, the rib 24 may be branched, or may be parallel or vertically to one side of the pixel electrode 15. Therefore, in Embodiment 1, one rib 24 has, for example, a straight line shape, a U-shape, a V-shape, a W-shape, or a combination thereof when viewed from the display face side.

As shown in FIG. 1, in Embodiment 1, the pixel electrode 15 included in the array substrate 1 is provided with the slits 17 for aligning the LC molecules 31 in a specific direction. The slits 17 each have a linear shape. The slit 17 and the rib 24 are alternately arranged parallel to each other and equally spaced, when viewed from the display face side. One of the slits 24 has a bent portion. The bent slit has a V-shape when the each pixel is viewed in plan.

Thus, when the ribs 24 and the slits 17 are arranged in an oblique direction relative to the respective sides of the pixel electrode 15, the LC molecules 31 in the LC layer 3 are aligned towards the ribs 24 and the slits 17. As a result, the viewing angle can be increased. Therefore the LCD device of Embodiment 1 is what is called a MVA LCD device.

In Embodiment 1, the array substrate 1 includes a light-shielding metal film 18 (hereinafter, also referred to as a "corner light-shielding metal film") that overlaps with the linear-shaped rib 24 that is arranged to overlap with the corner portion 10 of the pixel electrode 15, as a light-shielding member (corner light-shielding member). Examples of the material for the corner light-shielding metal film include aluminum (Al), silver (Ag), tantalum nitride (TaN), titanium nitride (TiN), and molybdenum nitride (MoN). The extended drain-drawing line 44 is formed as a light-shielding member (main light-shielding member) to overlap with the V-shaped rib, which is arranged to overlap with the center portion of the pixel electrode. The corner light-shielding metal film 18, which overlaps with the rib 24 overlapping with the corner portion 10 of the pixel electrode 15, has a linear shape. The drain-drawing line 44 is arranged to overlap with the CS line 43 as well as the rib 24 overlapping with the center portion of the pixel electrode 15, and so the drain-drawing line 44 has a W-shape when the entire pixel is viewed. The drain-drawing line 44 is composed of a light-shielding metal film and serves as a light-shielding member for a region the rib 24 is formed. The light-shielding members 18 and 44 are pattern-formed for example, by the following manner. A metal film is formed by sputtering and a resist is applied to a desired region of the metal film. The metal film is exposed through a mask, developed and etched, and then the resist is stripped. In Embodiment 1, for example, a black matrix included in the color filter substrate 2 maybe used as the light-shielding member instead of the metal film included in the array substrate 1.

If the light-shielding member is formed to overlap with the rib, which influences the LC molecules around the lib to have alignment different from that of other regions, light leakage in a black state can be prevented and the contrast ratio can be increased. Particularly, in Embodiment 1, the light-shielding member for blocking light transmitted through the rib 24 is arranged to overlap with the corner portion 10 of the pixel electrode 15 in addition to at the center portion of the pixel electrode 15. Therefore a high contrast ratio can be provided.

In Embodiment 1, the storage capacitor line 43, which is formed to overlap with the center portion of the pixel electrode 15, and the corner light-shielding metal film 18, which is formed to overlap with the corner portion 10 of the pixel electrode 15, each have a width larger than that of the rib 24. Thus, light leakage can be prevented without any problem even if misalignment occurs between the array substrate 1 and the color filter substrate 2. As a result, reliability of an improvement of contrast is increased.

The LCD device of Embodiment 1 may be used as both a transflective LCD device and a transmissive LCD device. When the LCD device of Embodiment 1 is used as a transmissive LCD device, a light source such as a backlight is placed on the rear side of the thus-produced array substrate 1.

When the LCD device of Embodiment 1 is used as a transflective LCD device, a light source such as a backlight is placed on the rear side of the thus-produced array substrate 1, and further a λ/4 retarder is arranged on both polarizers of the array and color filter substrates. The λ/4 retarder is arranged on an LC layer side-surface of each polarizer. The λ/4 retarder converts transmissive light, which is linearly polarized light passed through the polarizer, into circularly polarized light. As a result, the transflective LCD device can provide both transmissive display using light from the light source such as a backlight as display light and reflective display using reflected ambient light reflected by the drain-drawing line as display light.

In Embodiment 1, when the drain-drawing line 44 has a light reflective surface, it functions as not only the light-shielding member for light transmitted through the rib 24 but also a reflective member for reflective display. Examples of a high reflection material having light-shielding property include aluminum and silver.

Further, the transflective LCD device includes a multi-gap layer in a reflective region. This is needed to eliminate a phase difference of display light between a transmissive region and the reflective region. The phase difference is created because, in the transmissive region, light used as display light passes through an LC layer once, whereas in the reflective region, light used as display light passes through the LC layer twice, i.e., passes through it before and after reflected. The LC layer is so designed that the thickness thereof in the transmissive region is about twice as large as that in the reflection region by forming, in the array substrate 1, the interlayer insulating film 14 having a large thickness only in the reflective region as the multi-gap layer. Such a multi-gap layer permits compensation of the phase difference.

Embodiment 2

FIG. 3 is a plan view schematically showing a pixel constituting the display face of the liquid crystal display device in accordance with Embodiment 2. As shown in FIG. 3, the pixel configuration of the LCD device of Embodiment 2 is the same as that of Embodiment 1, except for the shape of the light-shielding member. Therefore, similarly to Embodiment 1, the light-shielding member for blocking light transmitted through a rib 24 is arranged to overlap with a corner portion 10 of a pixel electrode 15 in addition to a center portion of the pixel electrode 15. Therefore a high contrast ratio can be provided. Further, a storage capacitor line 43, which is formed to overlap with the center portion of the pixel electrode 15, and a corner light-shielding metal film 18, which is formed to overlap with the corner portion 10 of the pixel electrode 15, each have a width larger than that of the rib 24. Thus, light leakage can be prevented without any problem even if misalignment occurs between an array substrate 1 and a color filter substrate 2. As a result, reliability of an improvement of contrast is increased.

Further, in Embodiment 2, a drain-drawing line 44 and the corner light-shielding metal film 18, which are arranged to overlap with the rib 24, are electrically connected to each other through a conductive bridge 19. In Embodiment 2, the conductive bridge 19 extends from one end of the corner light-shielding metal film 18. Further, the conductive bridge 19 is formed in a direction perpendicular to the rib 24 and the slit 17. Therefore, according to Embodiment 2, the corner light-shielding metal film 18 is not isolated and even if unexpected static electricity is generated in the corner light-shielding metal film 18, the static electricity is discharged through the drain-drawing line 44. As a result, stable display qualities can be obtained.

FIG. 4 is a cross-sectional view schematically showing a configuration of a region including a conductive bridge in the liquid crystal display device in accordance with Embodiment 2, taken along line C-D in FIG. 3. As shown in FIG. 4, in Embodiment 2, the conductive bridge 19 is provided in a layer between a first interlayer insulating film 14a and a second interlayer insulating film 14b and the layer includes no pixel electrode 15. As shown in FIG. 3, the conductive bridge 19 is provided to extend across the slit 17 formed in the pixel electrode 15. In such a configuration, an electric potential around the slit 17 can be changed by effects of electric field leakage around the conductive bridge 19, which prevents reduction in response speed even if the slit 17 is too long or too narrow.

Embodiment 3

FIG. 5 is a plan view schematically showing a pixel constituting the display face of the liquid crystal display device in accordance with Embodiment 3. As shown in FIG. 5, the pixel configuration of the LCD device of Embodiment 3 is the same as that of Embodiment 1, except for the shape of the light-shielding member. Therefore, similarly to Embodiment 1, a light-shielding member for blocking light transmitted through a rib 24 is arranged to overlap with a corner portion 10 of a pixel electrode 15 in addition to a center portion of the pixel electrode 15. Therefore a high contrast ratio can be provided. Further, a drain-drawing line 44, which is formed to overlap with the center portion of the pixel electrode 15, and a corner light-shielding metal film 18, which is formed to overlap with the corner portion 10 of the pixel electrode 15 each have a width larger than that of the rib 24. Thus, light leakage can be prevented without any problem even if misalignment occurs between an array and a color filter substrate 1 and 2. As a result, reliability of an improvement of contrast is increased.

In Embodiment 3, similarly to Embodiment 2, the drain-drawing line 44 and the corner light-shielding metal film 18, which are arranged to overlap with the rib 24, are electrically connected to each other through a conductive bridge 19. In Embodiment 3, the conductive bridge 19 extends from the center portion of the corner light-shielding metal film 18. Further, the conductive bridge 19 is formed in a direction perpendicular to the rib 24 and the slit 17. Therefore, according to Embodiment 3, similarly to Embodiment 2, the corner light-shielding metal film 18 is not isolated and even if unexpected static electricity is generated in the corner light-shielding metal film 18, the static electricity is discharged through the drain-drawing line 44. As a result, stable display qualities can be obtained.

In Embodiment 3, the conductive bridge 19 is provided to extend across the slit 17 formed in the pixel electrode 15, and the conductive bridge 19 and the pixel electrode 15 are provided in different layers with an interlayer insulating film 14 therebetween. In such a configuration, similarly to Embodiment 2, an electric potential around the slit 17 can be changed by effects of electric field leakage around the conductive bridge 19, which prevents reduction in response speed even if the slit 17 is too long or too narrow.

In Embodiment 3, the conductive bridge 19 is arranged to extend across the middle portion of the slit 17, unlike in Embodiment 2. Therefore, the slit 17 is efficiently divided, which improves reliability of an improvement of response speed.

Embodiment 4

FIG. 6 is a plan view schematically showing a pixel constituting the display face of the liquid crystal display device in accordance with Embodiment 4. As shown in FIG. 6, the pixel configuration of the LCD device of Embodiment 4 is the same as that of Embodiment 1, except for the shape of the light-shielding member. However, in Embodiment 4, a corner light-shielding metal film 18 is arranged to overlap with only an upper right corner portion 10 of four corner portions of a pixel electrode 15. The number of the corner light-shielding metal film 18 can be changed suitably according to a design. In such a configuration, the light-shielding member for blocking light transmitted through a rib 24 is arranged to overlap with one corner portion 10 of the pixel electrode 15 in addition to a center portion of the pixel electrode 15. Therefore a high contrast ratio can be provided. Further, a drain-drawing line 44, which is formed to overlap with the center portion of the pixel electrode 15, and the corner light-shielding metal film 18, which is formed to overlap with the corner portion 10 of the pixel electrode 15, each have a width larger than that of the rib 24. Thus, light leakage can be prevented without any problem even if misalignment occurs between the array substrate 1 and the color filter substrate 2. As a result, reliability of an improvement of contrast is increased.

In Embodiment 4, similarly to Embodiment 2, the drain-drawing line 44 and the corner light-shielding metal film 18 at a corner portion 10, which are arranged to overlap with the rib 24, are electrically connected to each other through a conductive bridge 19. In Embodiment 4, the conductive bridge 19 extends from the center portion of the corner light-shielding metal film 18 having a linear-shape formed to overlap with the corner portion 10. The conductive bridge 19 is formed in a direction perpendicular to the rib 24 and the slit 17. Therefore, according to Embodiment 4, similarly to Embodiment 2, the corner light-shielding metal film 18 formed to overlap with the corner portion 10 is not isolated and even if unexpected static electricity is generated, the static electricity is discharged through the drain-drawing line 44. As a result, stable display qualities can be obtained.

In Embodiment 4, the conductive bridge 19 is provided to extend across the slit 17 formed in the pixel electrode 15, and the conductive bridge 19 and the pixel electrode 15 are provided in different layers with an interlayer insulating film 14 therebetween. In such a configuration, similarly to Embodiment 2, an electric potential around the slit 17 can be changed by effects of electric field leakage around the conductive bridge 19, which prevents reduction in response speed even if the slit 17 is too long or too narrow.

In Embodiment 4, the conductive bridge 19 is arranged to extend across the middle portion of the slit 17. Therefore, the slit 17 is efficiently divided, which improves reliability of an improvement of response speed.

Embodiment 5

FIG. 7 is a plan view schematically showing a pixel constituting the display face of the liquid crystal display device in accordance with Embodiment 5. As shown in FIG. 7, the pixel configuration of the LCD device of Embodiment 5 is the same as that of Embodiment 1, except for the shape of the light-shielding member. In Embodiment 5, both a drain-drawing line 44 and a CS line 43 are used as the light-shielding member. The CS line 43 almost completely overlaps with the drain-drawing line 44. That is, the CS line 43 also has a linear shape with a bent portion and has a W-shape when viewed from a display face. The CS line 43 and the drain-drawing line 44 may be designed like in this Embodiment in accordance with electrostatic capacitance formed therebetween. In Embodiment 5, similarly to Embodiment 1, the light-shielding member for blocking light transmitted through a rib 24 is arranged to overlap with a corner portion 10 of a pixel electrode 15 in addition to a center portion of the pixel electrode 15. Therefore a high contrast ratio can be provided. Further, the drain-drawing line 44 and the CS line 43, which are formed to overlap with the center portion of the pixel electrode 15, and the corner light-shielding metal film 18, which is formed to overlap with the corner portion 10 of the pixel electrode 15, each have a width larger than that of the rib 24. Thus, light leakage can be prevented without any problem even if misalignment occurs between the array substrate 1 and the color filter substrate 2. As a result, reliability of an improvement of contrast is increased.

In Embodiment 5, similarly to Embodiment 2, the drain-drawing line 44 and the corner light-shielding metal film 18, which are arranged to overlap with the rib 24, are electrically connected to each other through a conductive bridge 19. In Embodiment 5, the conductive bridge 19 extends from the center portion of the corner light-shielding metal film 18. The conductive bridge 19 is formed in a direction perpendicular to the rib 24 and the slit 17. Therefore, according to Embodiment 5, similarly to Embodiment 2, the corner light-shielding metal film 18 is not isolated and even if unexpected static electricity is generated in the corner light-shielding metal film 18, the static electricity is discharged through the drain-drawing line 44. As a result, stable display qualities can be obtained.

In Embodiment 5, the conductive bridge 19 is provided to extend across the slit 17 formed in the pixel electrode 15, and the conductive bridge 19 and the pixel electrode 15 are provided in different layers with an interlayer insulating film 14 therebetween. In such a configuration, similarly to Embodiment 2, an electric potential around the slit 17 can be changed by effects of electric field leakage around the conductive bridge 19, which prevents reduction in response speed even if the slit 17 is too long or too narrow.

In Embodiment 5, similarly to Embodiment 3, the conductive bridge 19 is arranged to extend across the middle portion of the slit 17. Therefore, the linear-shaped slit 17 is efficiently divided, which improves reliability of an improvement of response speed.

In Embodiment 5, the CS line 43 is widely formed to overlap with other portions of the pixel electrode 15 in addition to the center portion. This allows that the area of the Cs wiring 43 at the center portion of the pixel electrode 15 can be reduced as compared with Embodiments 1 to 4. As a result, an aperture ratio can be improved. When the CS line 43 and the drain-drawing line 44 are used as the light-shielding member like in Embodiment 5, the design of the lines becomes efficient and the display qualities can be improved.

Embodiment 6

FIG. 8 is a plan view schematically showing a pixel constituting the display face of the liquid crystal display device in accordance with Embodiment 6. As shown in FIG. 8, the pixel configuration of the LCD device of Embodiment 6 is the same as that of Embodiment 1, except for the shape of the light-shielding member. In addition, in Embodiment 6, both a drain-drawing line 44 and a CS line 43 are used as a light-shielding member similarly to Embodiment 5. However, unlike in Embodiment 5, the CS line 43 does not entirely overlap with the drain-drawing line 44 and does not overlap with a corner light-shielding metal film 18 at a corner portion 10 of a pixel electrode 15 and a conductive bridge 19. Such a design can be adopted in accordance with electrostatic capacitance formed between the drain-drawing line 44 and the CS line 43. In Embodiment 6, similarly to Embodiment 1, the light-shielding member for blocking light transmitted through a rib 24 is arranged to overlap with the corner portion 10 of the pixel electrode 15 in addition to at the center portion of the pixel electrode 15. Therefore a high contrast ratio can be provided. Further, the drain-drawing line 44 and the CS line 43, which are formed to overlap with the center portion of the pixel electrode 15, and the corner light-shielding metal film 18, which is formed to overlap with the corner portion 10 of the pixel electrode 15, each have a width larger than that of the rib 24. Thus, light leakage can be prevented without any problem even if misalignment occurs between the array substrate 1 and the color filter substrate 2. As a result, reliability of an improvement of contrast is increased.

In Embodiment 6, similarly to Embodiment 2, the drain-drawing line 44 and the corner light-shielding metal film 18, which are arranged to overlap with the rib 24, are electrically connected to each other through a conductive bridge 19. In Embodiment 6, the conductive bridge 19 extends from the center portion of the corner light-shielding metal film 18. The conductive bridge 19 is formed in a direction perpendicular to the rib 24 and the slit 17. Therefore, according to Embodiment 6, similarly to Embodiment 2, the corner light-shielding metal film 18 at the corner portion 10 is not isolated and even if unexpected static electricity is generated in the corner light-shielding metal film 18, the static electricity is discharged through the drain-drawing line 44. As a result, stable display qualities can be obtained.

In Embodiment 6, the conductive bridge 19 is provided to extend across the slit 17 formed in the pixel electrode 15, and the conductive bridge 19 and the pixel electrode 15 are provided in different layers with an interlayer insulating film 14 therebetween. In such a configuration, similarly to Embodiment 2, an electric potential around the slit 17 can be changed by effects of electric field leakage around the conductive bridge 19, which prevents reduction in response speed even if the slit 17 is too long or too narrow.

In Embodiment 6, similarly to Embodiment 3, the conductive bridge 19 is arranged to extend across the middle portion of the slit 17. Therefore, the slit 17 is efficiently divided, which improves reliability of an improvement of response speed.

In Embodiment 6, the CS line 43 is widely formed to overlap with other portions of the pixel electrode 15 in addition to the center portion. This allows that the area of the Cs wiring 43 at the center portion of the pixel electrode 15 can be reduced as compared with Embodiments 1 to 4. As a result, an aperture ratio can be improved. When the CS line 43 and the drain-drawing line 44 are used as the light-shielding member like in Embodiment 6, the design of the lines becomes efficient and the display qualities can be improved.

Evaluation Test

The following simulations were performed to determine the effect of improving response characteristics in the present Embodiments where the electric potential of the slit formed in the pixel electrode is adjusted by the conductive bridge to improve the response characteristics.

An LCD device of Reference Embodiment 1 including a pixel electrode having a slit with 9 μm in width and an LCD device of Reference Embodiment 2 including a pixel electrode having a slit with 5 μm in width were simulated for alignment behavior of LC molecules positioned in and around the slit.

FIGS. 9 to 11 are views showing response characteristics of liquid crystal molecules in a liquid crystal display device in accordance with Reference Embodiment 1. FIG. 9 is a view after 10 msec of voltage application. FIG. 10 is a view after 100 msec of voltage application. FIG. 11 is a view after 500 msec of voltage application. FIGS. 9(*a*), 10(*a*) and 11(*a*) are enlarged views showing the slit and the LC molecules. FIGS. 9(*b*), 10(*b*), and 11(*b*) are further enlarged views of the slit and LC molecules shown in FIGS. 9(*a*), 10(*a*) and 11(*a*). In FIGS. 9 to 11, the black line shows an equipotential line.

As shown in FIGS. 9 to 11 showing the slit with 9 μm in width (Reference Embodiment 1), whereas LC molecules positioned in the slit are aligned vertically to the pixel electrode surface, LC molecules positioned around an outline of the slit are aligned in parallel to the pixel electrode surface and in a direction perpendicular to a longitudinal direction of the slit immediately after the LC molecules start to be aligned (after 10 msec of voltage application). This tendency was not changed even after 100 msec, 500 msec or more of voltage application.

FIGS. 12 to 14 are views showing response characteristics of liquid crystal molecules in a liquid crystal display device in accordance with Reference Embodiment 2. FIG. 12 is a view after 10 msec of voltage application. FIG. 13 is a view after 100 msec of voltage application. FIG. 14 is a view after 500 msec of voltage application. FIGS. 12(a), 13(a) and 14(a) are enlarged views showing the slit and the LC molecules. FIGS. 12(b), 13(b), and 14(b) are further enlarged views of the slit and LC molecules shown in FIGS. 9(a), 10(a) and 11(a). In FIGS. 12 to 14, the black line shows an equipotential line.

As shown in FIGS. 12 to 14, when the slit has a 5 μm width (Reference Embodiment 2), LC molecules positioned in the slit and around an outline of the slit, except for LC molecules positioned above the longitudinal center line of the slit, are aligned in parallel to the pixel electrode surface and in a direction perpendicular to the longitudinal direction of the slit, immediately after the LC molecules start to be aligned (after 10 msec of voltage application). The LC molecules positioned on the longitudinal center line of the slit are aligned vertically to the pixel electrode surface. However, with the elapse of 100 msec, 500 msec or more, the LC molecules positioned on the longitudinal center line of the slit are gradually tilted to the pixel electrode surface and in an oblique direction relative to the longitudinal direction of the slit, and eventually aligned in the longitudinal direction of the slit and in an oblique direction relative to the pixel electrode surface. The alignment direction of the LC molecules positioned in the slit, except for the LC molecules positioned on the longitudinal center line of the slit, are eventually aligned in an oblique direction with respect to the longitudinal direction of the slit and in an oblique direction relative to the pixel electrode surface. In the LCD device of Reference Embodiment 2, as shown in FIGS. 13 and 14 showing the alignment behaviors after 100 msec and 500 msec of voltage applications, a region where the alignment direction of the LC molecules with respect to the longitudinal direction of the slit is symmetrical with respect to a singular point in which the LC molecules are aligned vertically to the pixel electrode surface is partially formed in the slit. The alignment of the LC molecules between adjacent ones of the singular points is uniform.

Then simulated was alignment behavior of LC molecules positioned in and around a slit of a pixel electrode when a conductive bridge is arranged to overlap with the slit like Embodiments 2 to 6 of the present invention. In this simulation, the slit width is 5 μm. FIGS. 15 to 17 are views showing response characteristics of liquid crystal molecules in a liquid crystal display device in accordance with Embodiments 2 to 6. FIG. 15 is a view after 10 msec of voltage application. FIG. 16 is a view after 100 msec of voltage application. FIG. 17 is a view after 500 msec of voltage application. FIGS. 15(a), 16(a) and 17(a) are enlarged views showing the slit and the LC molecules. FIGS. 15(b), 16(b), and 17(b) are further enlarged views of the slit and LC molecules shown in FIGS. 9(a), 10(a) and 11(a). In FIGS. 15 to 17, the black line shows an equipotential line.

As shown in FIGS. 15 to 17, in the LCD device in Embodiments 2 to 6, the conductive bridge divides an equipotential line that is formed along the shape of the slit. A fixed singular point of LC alignment is generated at an intersection of the center line of the slit and the center line of the conductive bridge, between the divided equipotential lines. The LC molecules are aligned symmetrically with respect to the singular point. A more detailed description is described below.

As shown in FIGS. 15 to 17, the alignment direction of the LC molecules positioned in a region where no conductive bridge is formed is changed in the same way as in shown in FIGS. 12 to 14 of Reference Embodiment 2. At the intersection of the center line of the slit and the center line of the conductive bridge, the LC molecules, mainly those aligned vertically to the pixel electrode surface, form the singular point, and with respect to this singular point, other LC molecules are aligned symmetrically.

Specifically, first, immediately after a voltage is applied (after 10 msec of voltage application), in the longitudinal direction of the slit, the LC molecules are aligned towards the singular point along the slit center line and in parallel to the pixel electrode surface. In the longitudinal direction of the conductive bridge, the LC molecules are aligned towards the singular point along the conductive bridge center line and in parallel to the pixel electrode surface. Since the longitudinal directions of the slit and the conductive bridge are perpendicular to each other, the LC molecules on the slit center line and the LC molecules on conductive bridge center line form an X-shape. The LC molecules in a region other than the slit center line and the conductive bridge center line are aligned in a certain range in an oblique direction relative to the slit center line and the conductive bridge center line (in the present Embodiment, in the transverse direction and longitudinal direction of the pixel electrode) and are symmetrical with respect to the singular point. Further, the LC molecules in the region other than the slit center line and the conductive bridge center line are aligned to form a swastika shape (windmill shape), specifically, a shape formed by cubic curves perpendicular to each other with the intersection between the two center lines being an inflection point. The LC molecules at the end of the swastika shape (windmill shape), i.e., near the slit center line and the conductive bridge center line are aligned to form a ninja star shape, i.e., a shape formed by four rhombuses arranged in mutually-perpendicular two directions because the molecules are attracted towards the longitudinal directions of the slit and the conductive bridge.

Then, the alignment of the liquid crystal molecules varies as time goes on, and as a result, the singular point disappears. However, the tendency of the alignment of the LC molecules is not so changed. Specifically, the LC molecules on the slit and conductive bridge center lines keep an X-shape, the LC molecules in the region other than the slit and conductive bridge center lines keep a swastika shape (windmill shape), and the LC molecules in the region near the slit and conductive bridge center lines keep a ninja star shape. In particular, no significant change is observed in orientation of the LC molecules between 100 msec later and 500 msec later. According to Embodiment 2 to 6, the singular point is formed at every intersection of the slit and the conductive bridge. Therefore, the total number of the singular points in Embodiments 2 to 6 is larger than that in Reference Embodiments 1 and 2.

As described above, the singular point toward which the LC molecules are aligned can be intentionally formed by arranging the conductive bridge to extend across the middle portion of the slit, and this singular point changes the alignment of the LC molecules.

As shown in FIGS. 15 to 17, in the LCD device of Embodiments 2 to 6, immediately after a voltage is applied (after 10 msec of voltage application), the LC molecules in the slit start to be aligned in a oblique direction relative to the pixel electrode surface and in a oblique direction relative to the longitudinal direction of the slit and further form the singular point. The alignment change reaches the state of equilibrium in 100 msec, and display brightness becomes stable. Therefore, even if the slit has a 5 μm width, a decrease in response time, i.e., an increase in response speed can be achieved by arranging the conductive bridge to extend across the slit. As a result, an afterimage is less likely to be formed.

FIG. 18 is a graph showing a change in luminance with time in the liquid crystal display devices in accordance with Reference Embodiments 1 and 2, and Embodiments 2 to 6. In the graph of FIG. 18, the black circles represent Reference Embodiment 1 (slit with 9 μm in width), the black triangles represent Reference Embodiment 2 (slit with 5 μm in width), and the black quadrangles represent Embodiments 2 to 6 (slit with 5 μm in width and conductive bridge overlapping therewith).

As shown in FIG. 18, in the LCD device in accordance with Reference Embodiments 2, from immediately after the LC molecules start to be aligned (10 msec later) to 200 msec later, display with high brightness is provided because the LC molecules are mostly aligned in a direction perpendicular to the longitudinal direction of the slit. However, the alignment becomes unstable gradually with elapse of time, which reduces the brightness. The alignment reaches the state of equilibrium about 500 msec later, and the brightness becomes stable. In contrast to Reference Embodiments 2, in the LCD device in accordance with Reference Embodiments 1, display brightness is gradually improved because the LC molecules are gradually aligned in a direction perpendicular to the longitudinal direction of the slit with elapse of time. The alignment reaches the state of equilibrium about after 100 msec of voltage application, and the display brightness becomes stable. Compared with Reference Embodiment 1, in the LCD device of Reference Embodiment 2, luminance is significantly varied and response time is slow. In such an LCD device in accordance with Reference Embodiment 2, an afterimage is likely to be formed compared with the LCD device of Reference Embodiment 1. As mentioned above, when the width of the slit is too small, i.e., when an aspect ratio is too large, display qualities are likely to be deteriorated.

In contrast to such Reference Embodiments 1 and 2, in the LCD device of Embodiments 2 to 6, similarly to Reference Embodiment 1, from immediately after the LC molecules start to be aligned (10 msec later) to 200 msec later, display with high brightness is provided because the LC molecules are mostly aligned in a direction perpendicular to the longitudinal direction of the slit. However, luminance is not varied as much as in Reference Embodiment 1 and stable brightness can be obtained about 50 msec later. This shows that the response has been completed about 50 msec later. As a result, the response speed is high as compared with that in Reference Embodiments 1 and 2 and an afterimage less likely to be formed.

The present application claims priority to Patent Application No. 2008-034406 filed in Japan on Feb. 15, 2008 under the Paris Convention and provisions of national law in a designated State, the entire contents of which are hereby incorporated by reference.

BRIEF DESCRIPTION OF DRAWINGS

FIG. 9(a) is an enlarged view of a slit and liquid crystal molecules. FIG. 9(b) is a further enlarged view of FIG. 9(a).

FIG. 10(a) is an enlarged view of a slit and liquid crystal molecules. FIG. 10(b) is an enlarged view of FIG. 10(a).

FIG. 11(a) is an enlarged view of a slit and liquid crystal molecules. FIG. 11(b) is an enlarged view of FIG. 11(a).

FIG. 12(a) is an enlarged view of a slit and liquid crystal molecules. FIG. 12(b) is an enlarged view of FIG. 12(a).

FIG. 13(a) is an enlarged view of a slit and liquid crystal molecules. FIG. 13(b) is an enlarged view of FIG. 13(a).

FIG. 14(a) is an enlarged view of a slit and liquid crystal molecules. FIG. 14(b) is an enlarged view of FIG. 14(a).

FIG. 15(a) is an enlarged view of a slit and liquid crystal molecules. FIG. 15(b) is an enlarged view of FIG. 15(a).

FIG. 16(a) is an enlarged view of a slit and liquid crystal molecules. FIG. 16(b) is an enlarged view of FIG. 16(a).

FIG. 17(a) is an enlarged view of a slit and liquid crystal molecules. FIG. 17(b) is an enlarged view of FIG. 17(a).

EXPLANATION OF NUMERALS AND SYMBOLS

Figure 1:
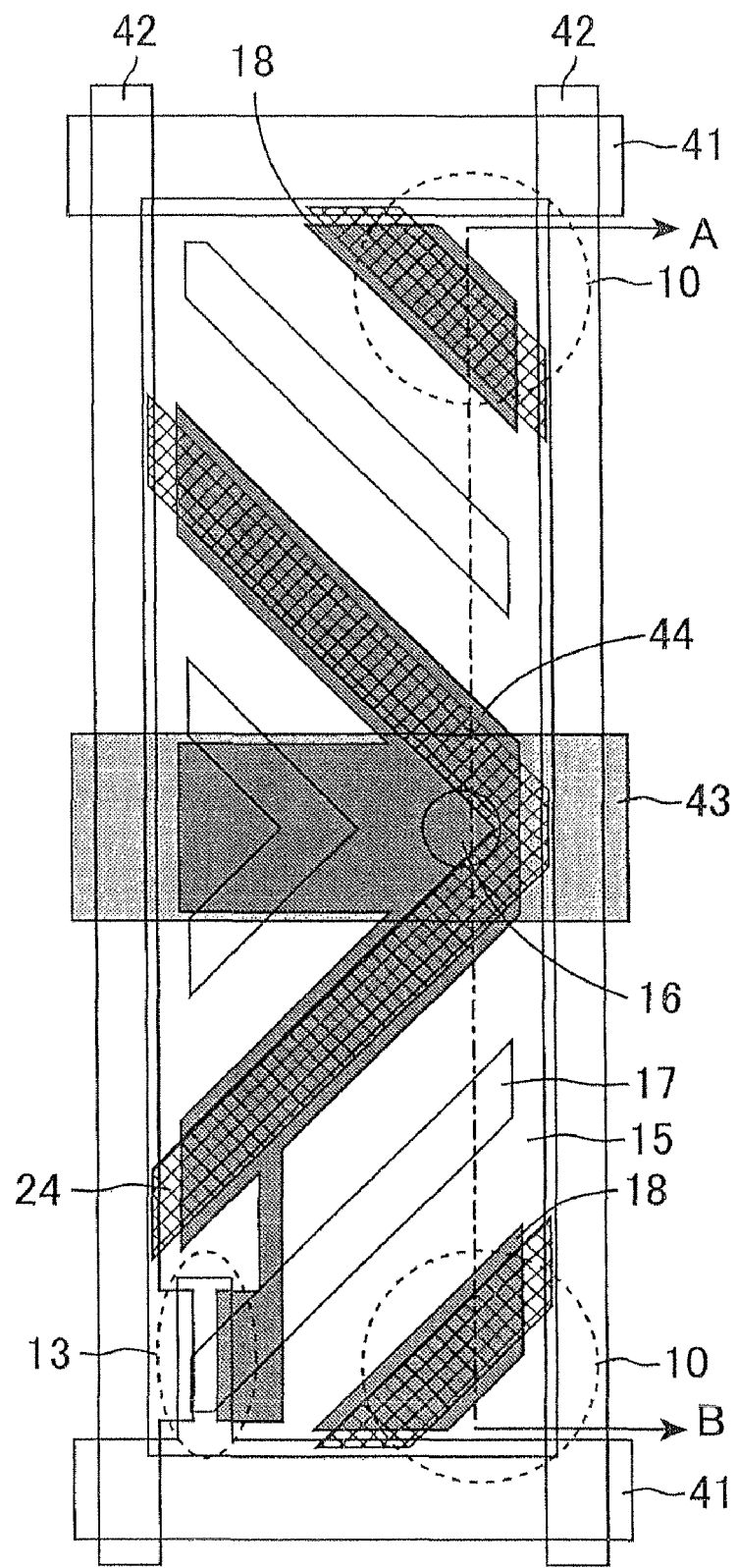
FIG. 1 is a plan view schematically showing a pixel constituting the display face of the liquid crystal display device in accordance with Embodiment 1.
Figure 2:
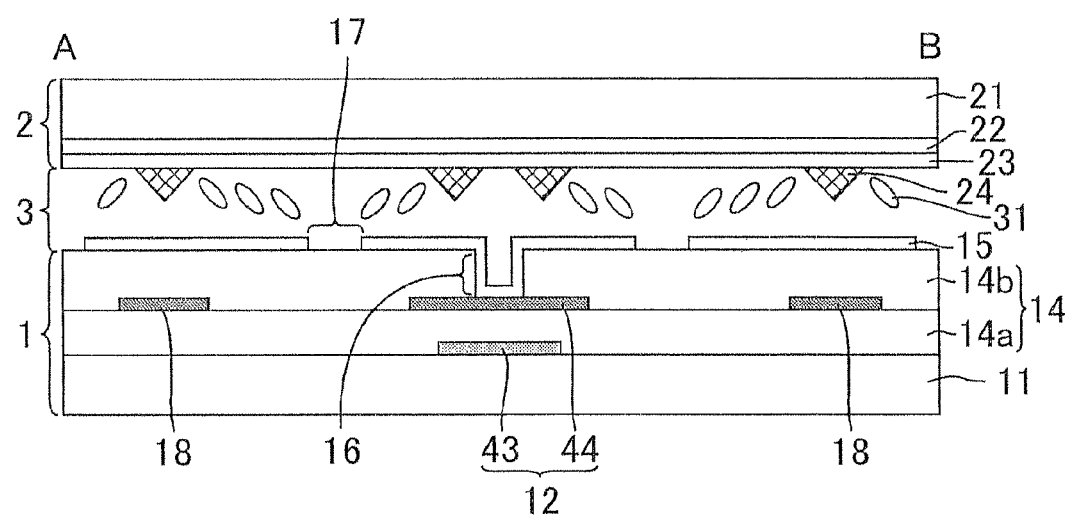
FIG. 2 is a cross-sectional view schematically showing a substrate configuration of the liquid crystal display device in accordance with Embodiment 1, taken along line A-B in FIG. 1.
Figure 3:
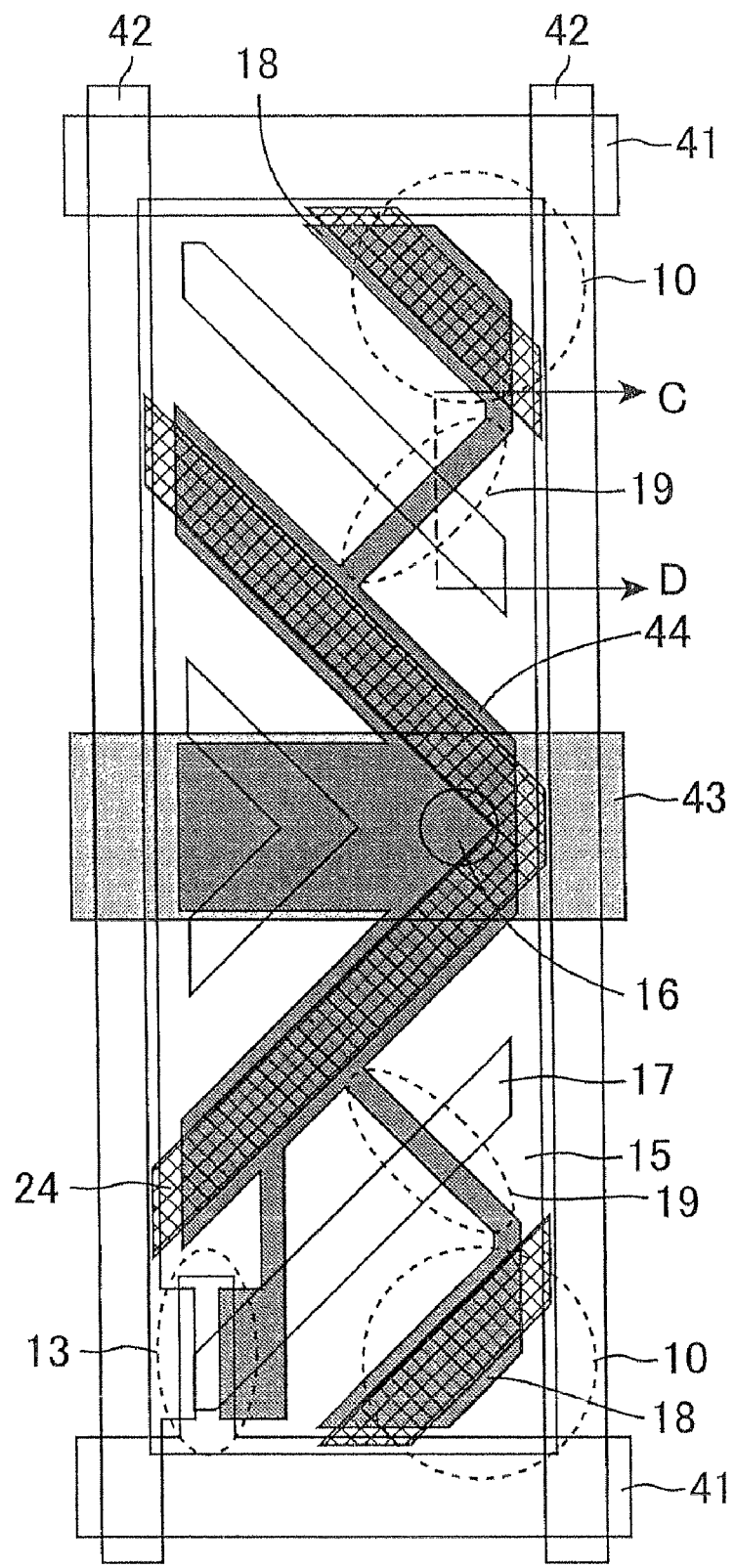
FIG. 3 is a plan view schematically showing a pixel constituting the display face of the liquid crystal display device in accordance with Embodiment 2.
Figure 4:
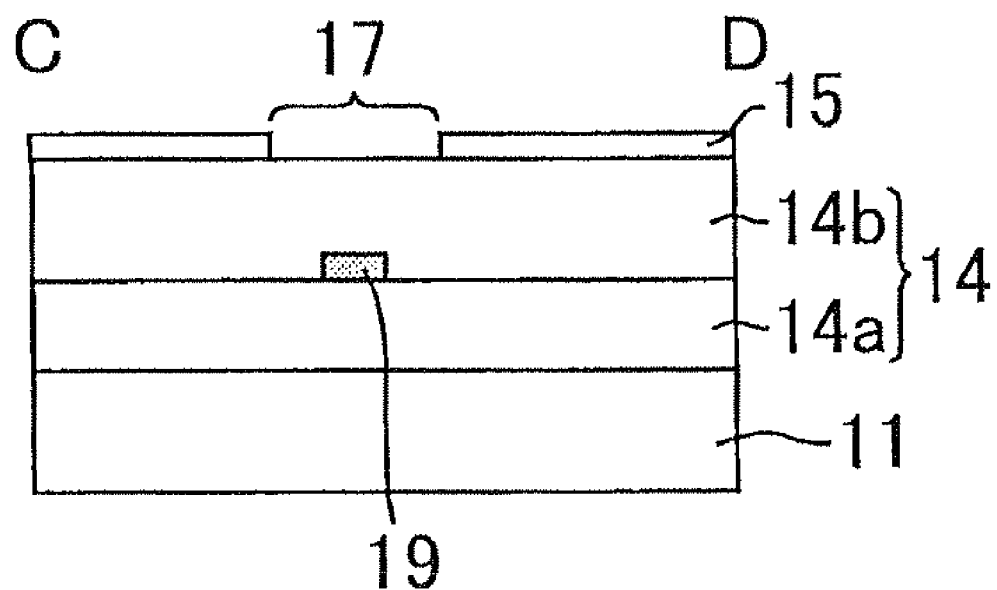
FIG. 4 is a cross-sectional view schematically showing a configuration of a region including a conductive bridge in the liquid crystal display device in accordance with Embodiment 2, taken along line C-D in FIG. 3.
Figure 5:
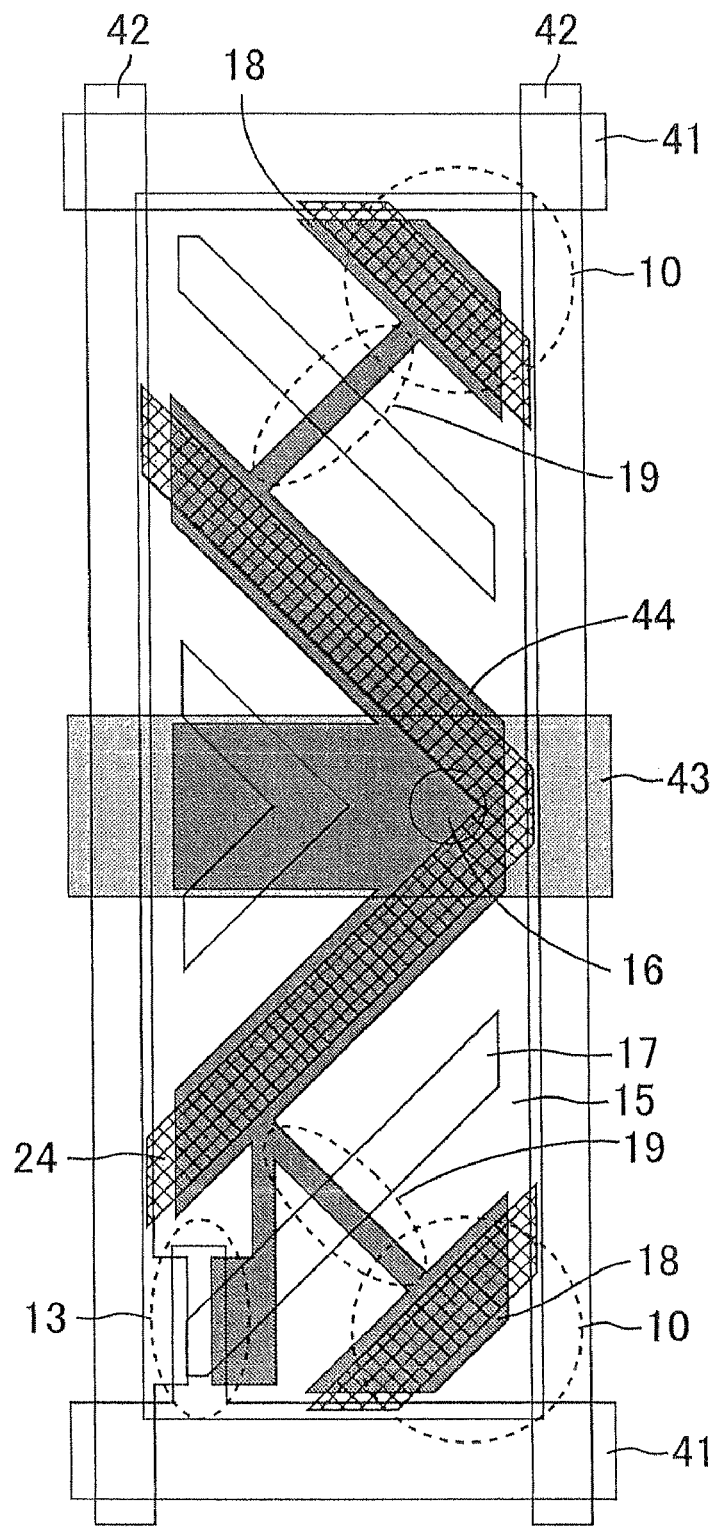
FIG. 5 is a plan view schematically showing a pixel constituting the display face of the liquid crystal display device in accordance with Embodiment 3.
Figure 6:
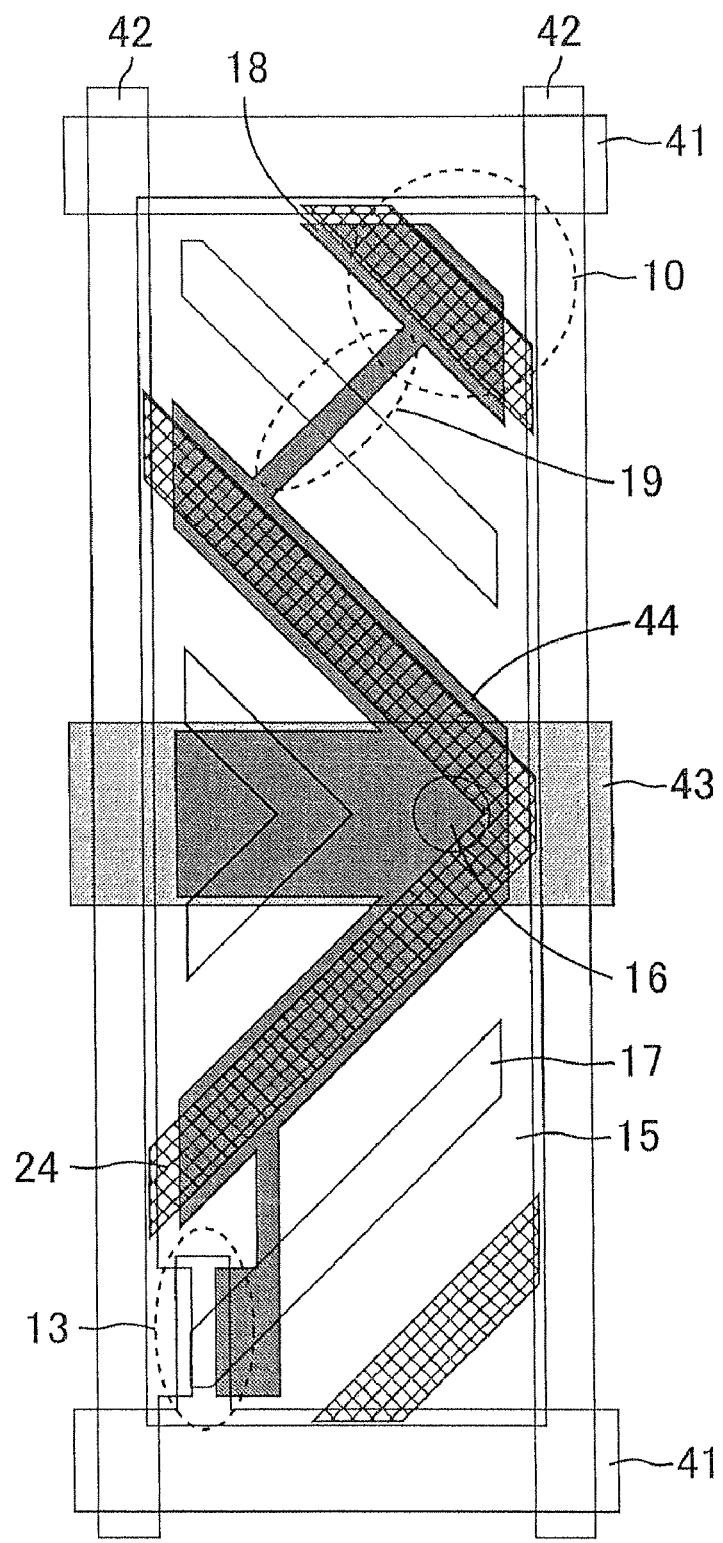
FIG. 6 is a plan view schematically showing a pixel constituting the display face of the liquid crystal display device in accordance with Embodiment 4.
Figure 7:
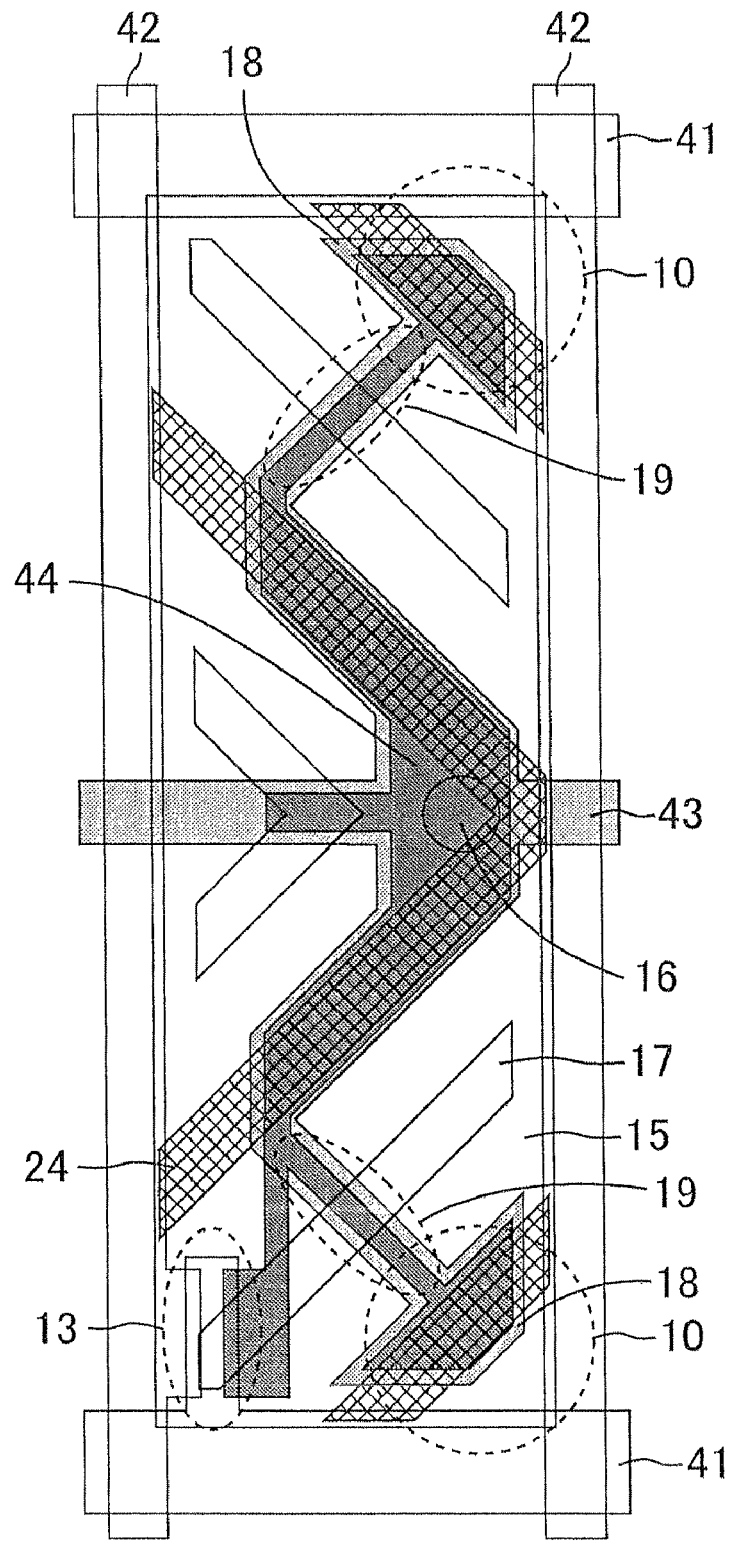
FIG. 7 is a plan view schematically showing a pixel constituting the display face of the liquid crystal display device in accordance with Embodiment 5.
Figure 8:
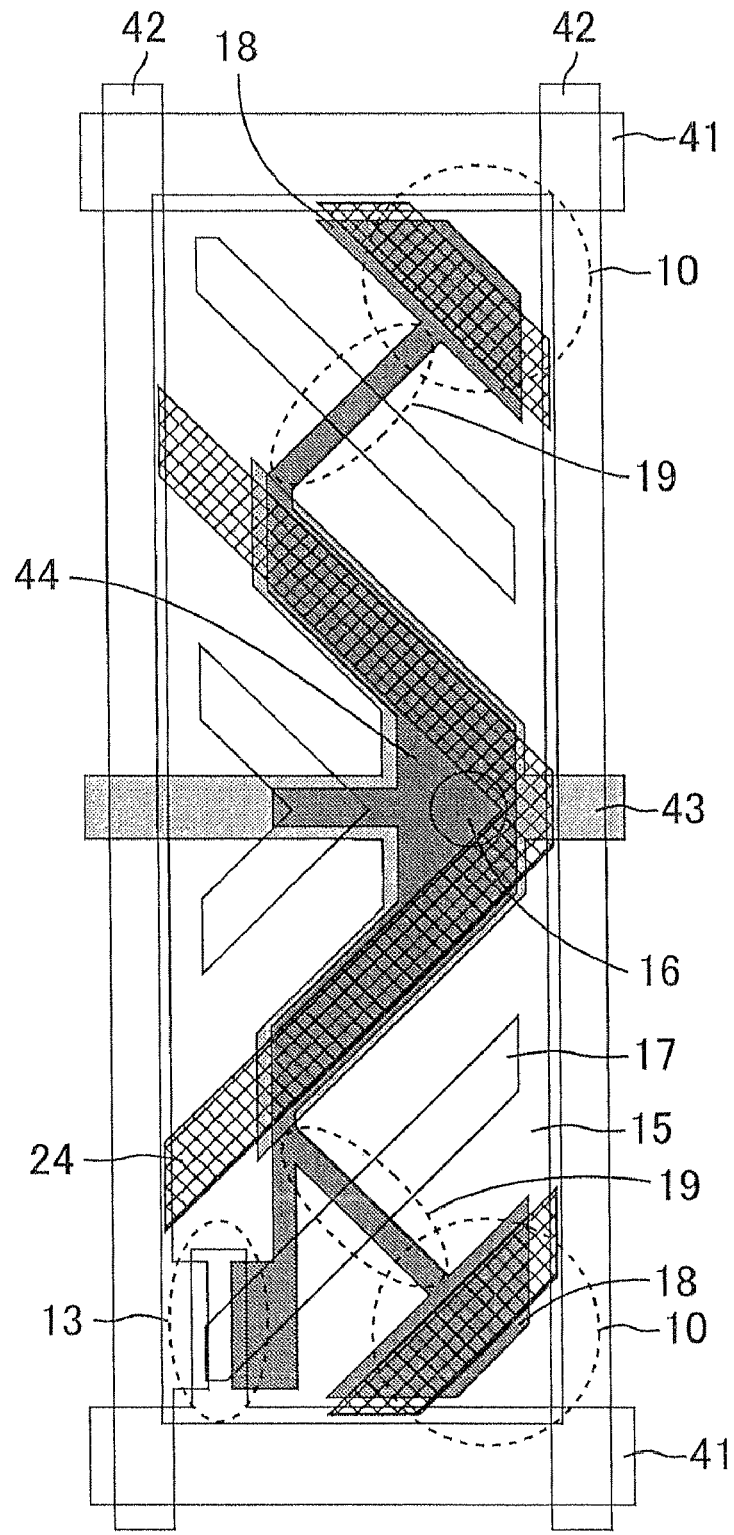
FIG. 8 is a plan view schematically showing a pixel constituting the display face of the liquid crystal display device in accordance with Embodiment 6.
Figure 9:
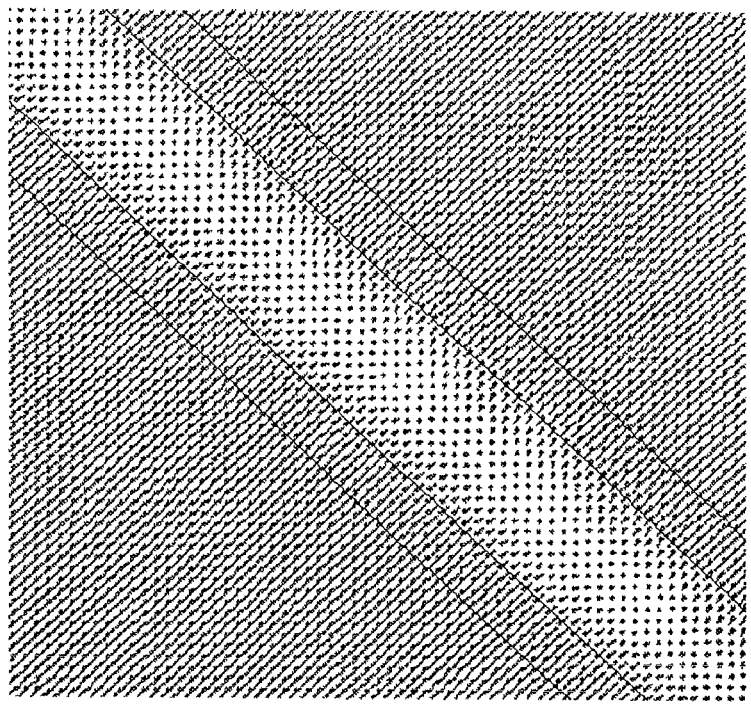
FIG. 9 is a view showing response characteristics of liquid crystal molecules in a liquid crystal display device in accordance with Reference Embodiment 1 and is a view after 10 msec of voltage application.
Figure 9:
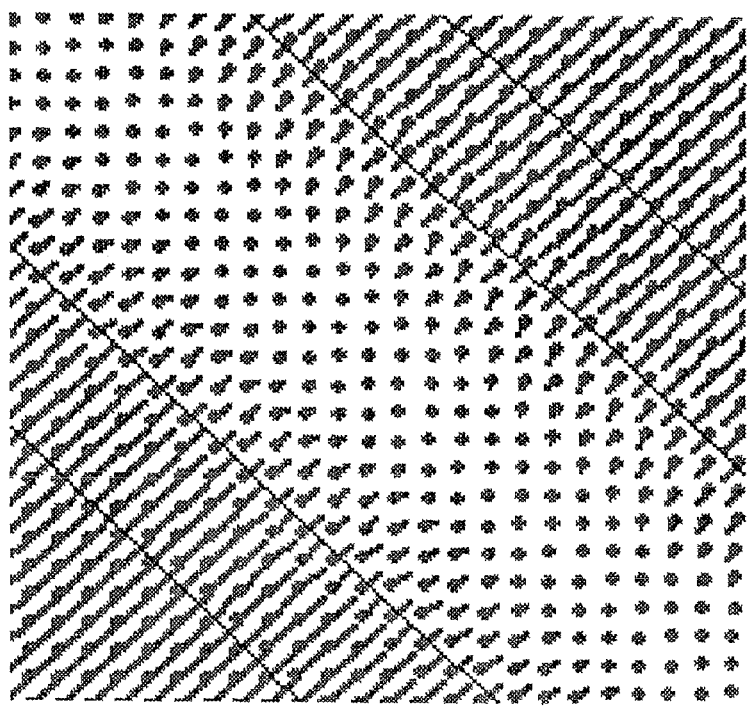
Figure 10:
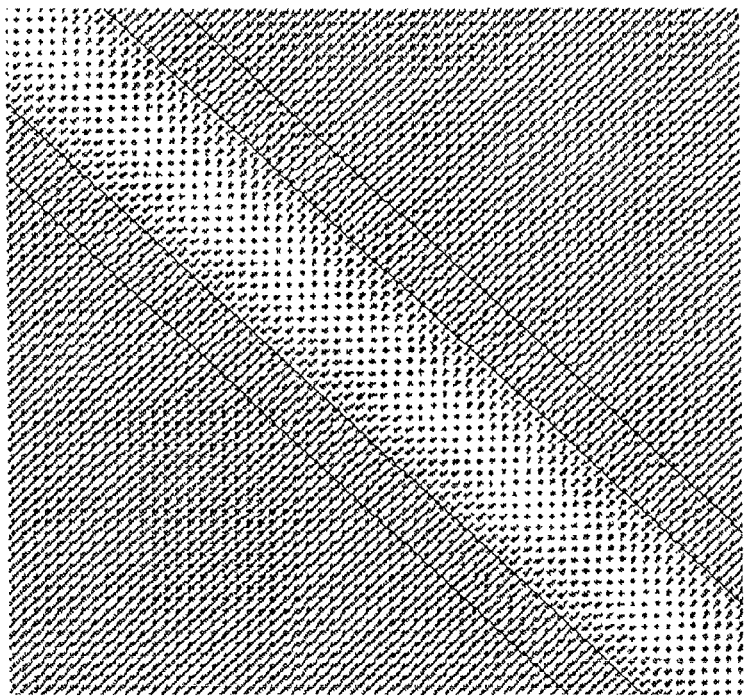
FIG. 10 is a view showing response characteristics of liquid crystal molecules in a liquid crystal display device in accordance with Reference Embodiment 1 and is a view after 100 msec of voltage application.
Figure 10:
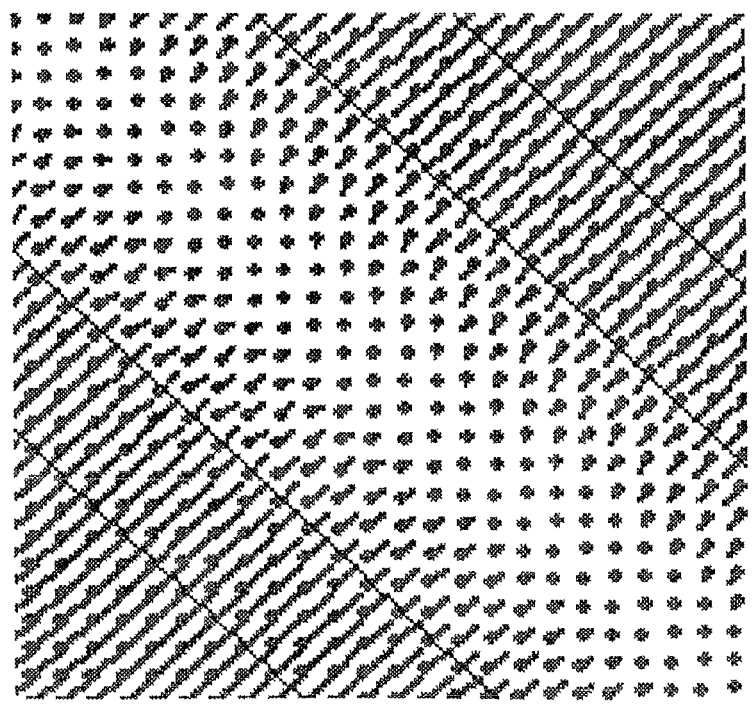
Figure 11:
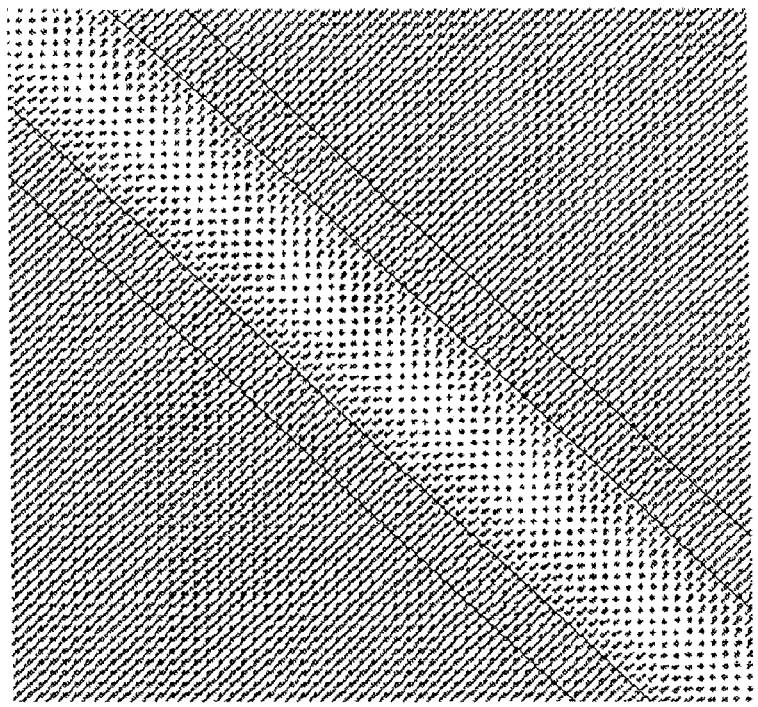
FIG. 11 is a view showing response characteristics of liquid crystal molecules in a liquid crystal display device in accordance with Reference Embodiment 1 and is a view after 500 msec of voltage application.
Figure 11:
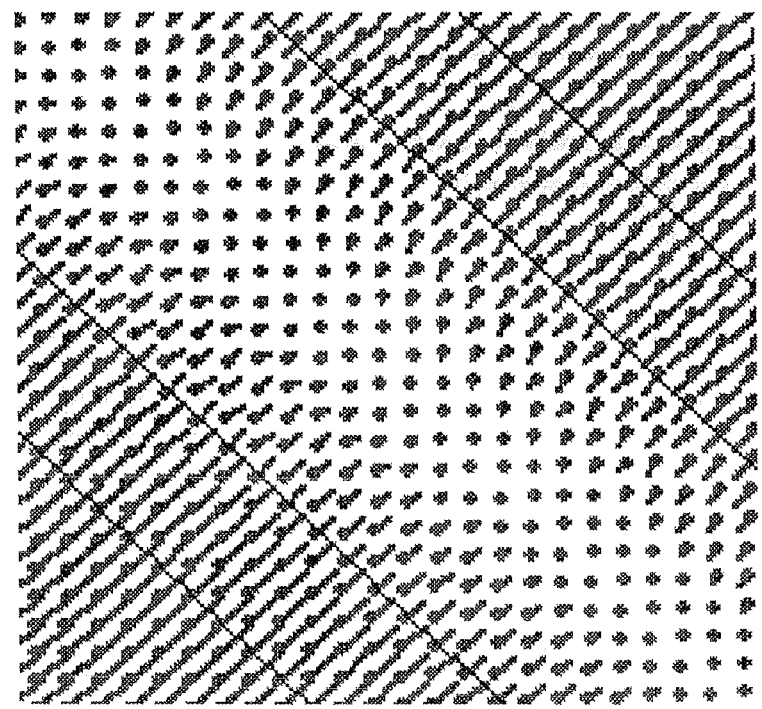
Figure 12:
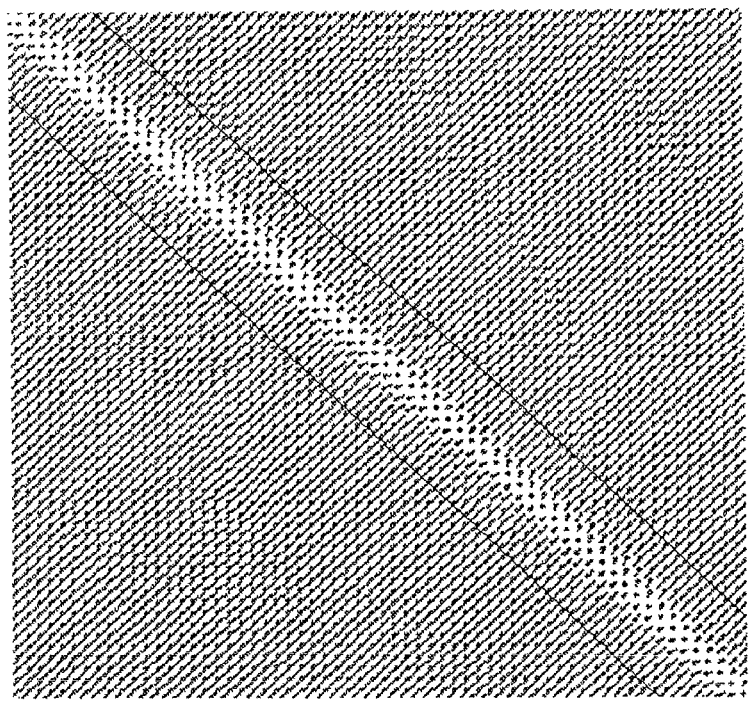
FIG. 12 is a view showing response characteristics of liquid crystal molecules in a liquid crystal display device in accordance with Reference Embodiment 2 and is a view after 10 msec of voltage application.
Figure 12:
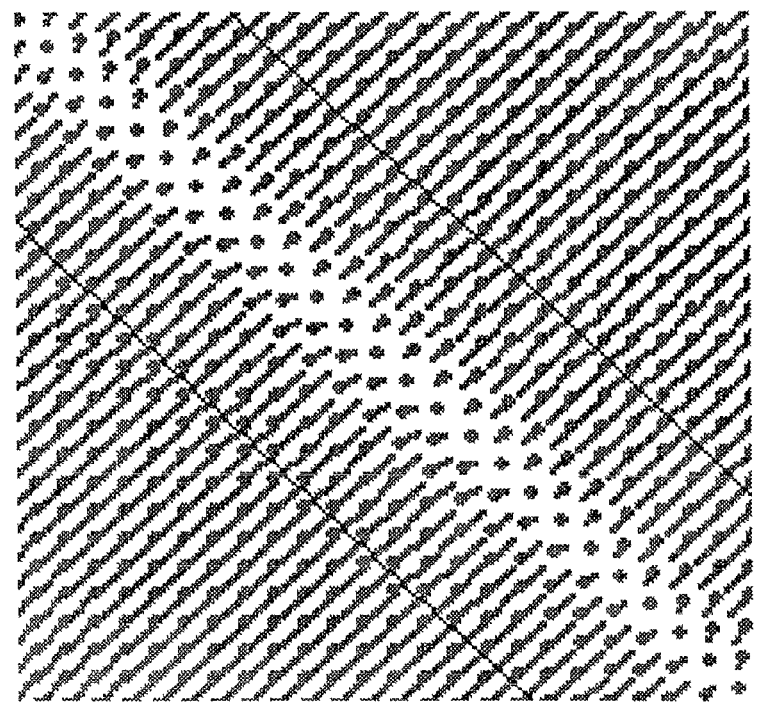
Figure 13:
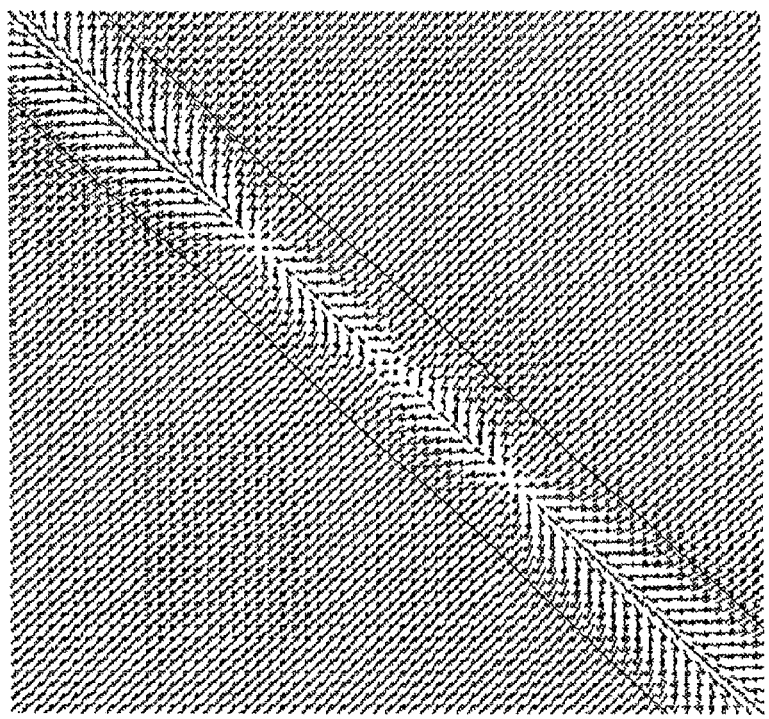
FIG. 13 is a view showing response characteristics of liquid crystal molecules in a liquid crystal display device in accordance with Reference Embodiment 2 and is a view after 100 msec of voltage application.
Figure 13:
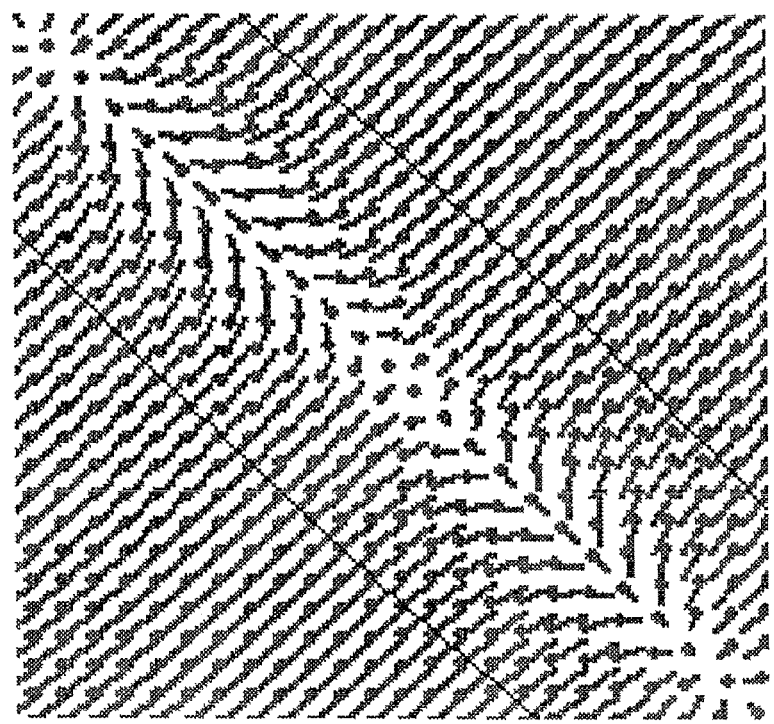
Figure 14:
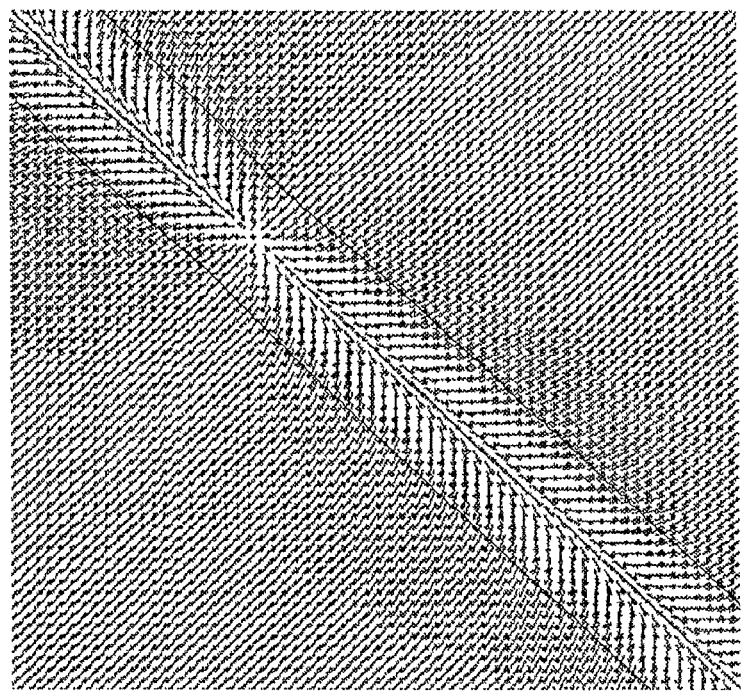
FIG. 14 is a view showing response characteristics of liquid crystal molecules in a liquid crystal display device in accordance with Reference Embodiment 2 and is a view after 500 msec of voltage application.
Figure 14:
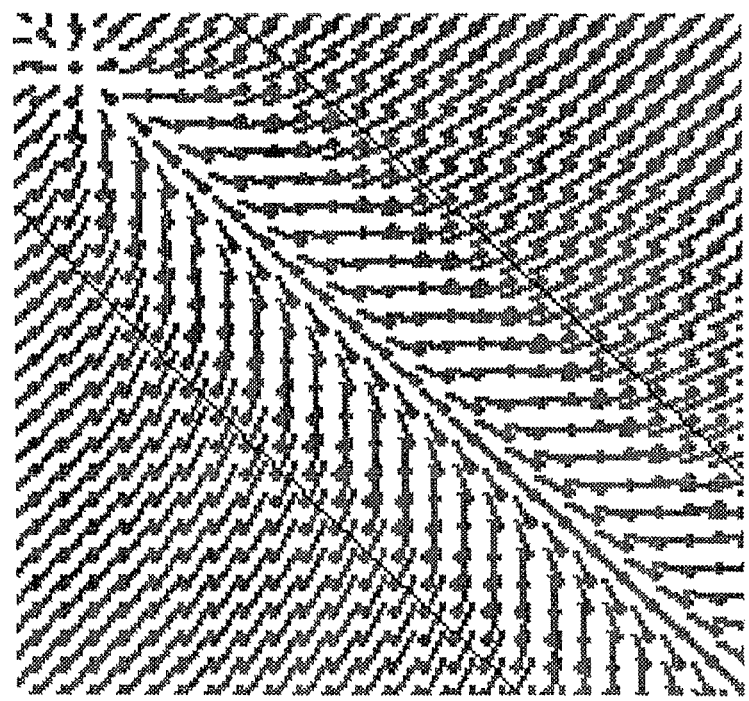
Figure 15:
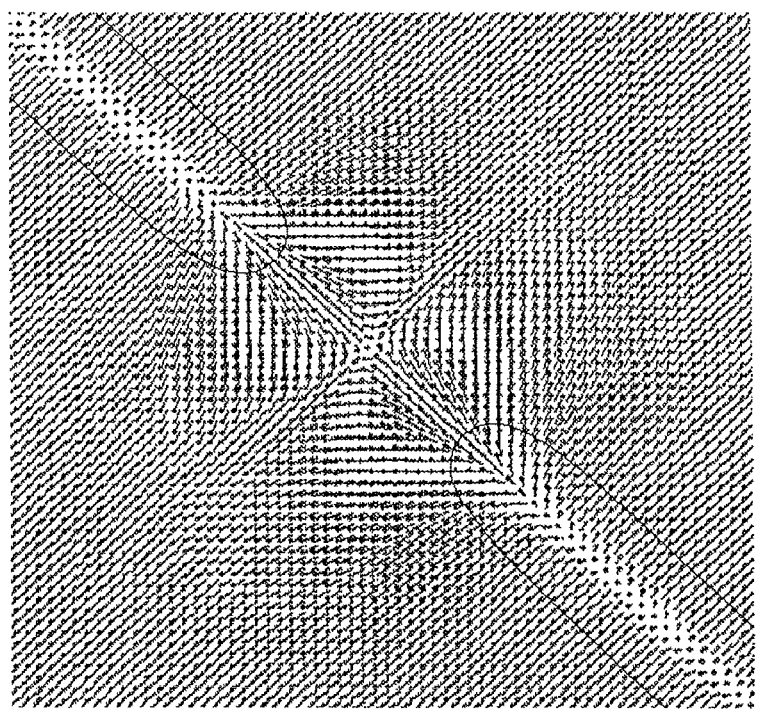
FIG. 15 is a view showing response characteristics of liquid crystal molecules in a liquid crystal display device in accordance with Embodiments 2 to 6 and is a view after 10 msec of voltage application.
Figure 15:
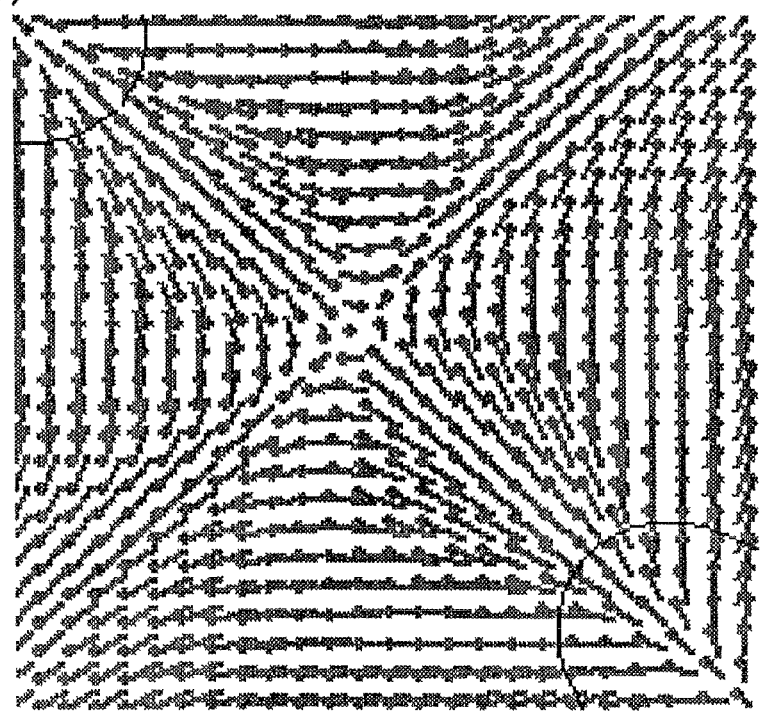
Figure 16:
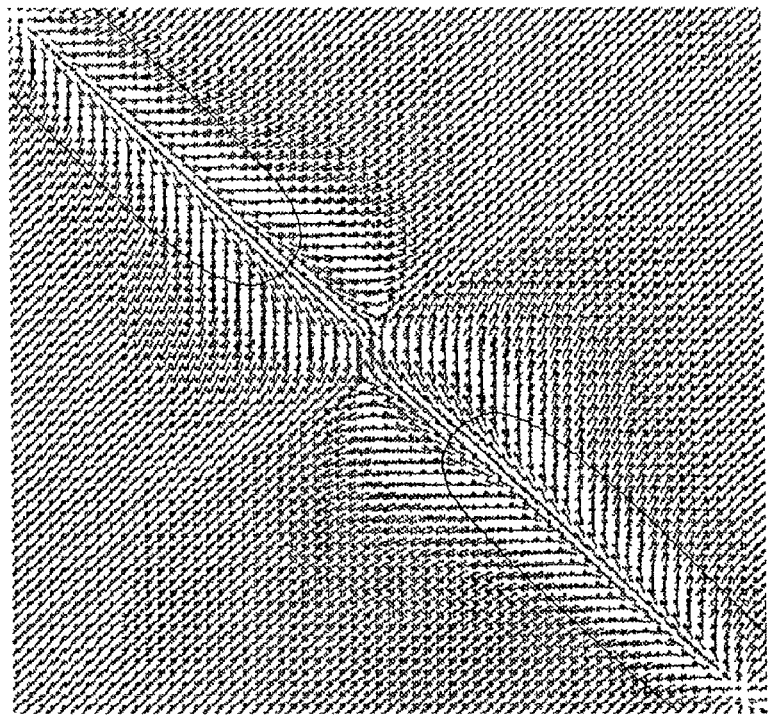
FIG. 16 is a view showing response characteristics of liquid crystal molecules in a liquid crystal display device in accordance with Embodiments 2 to 6 and is a view after 100 msec of voltage application.
Figure 16:
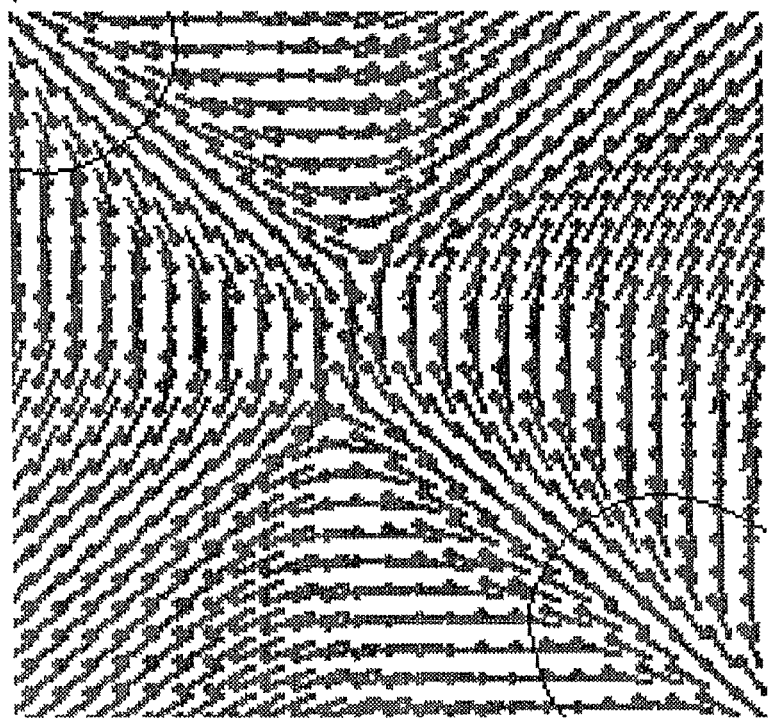
Figure 17:
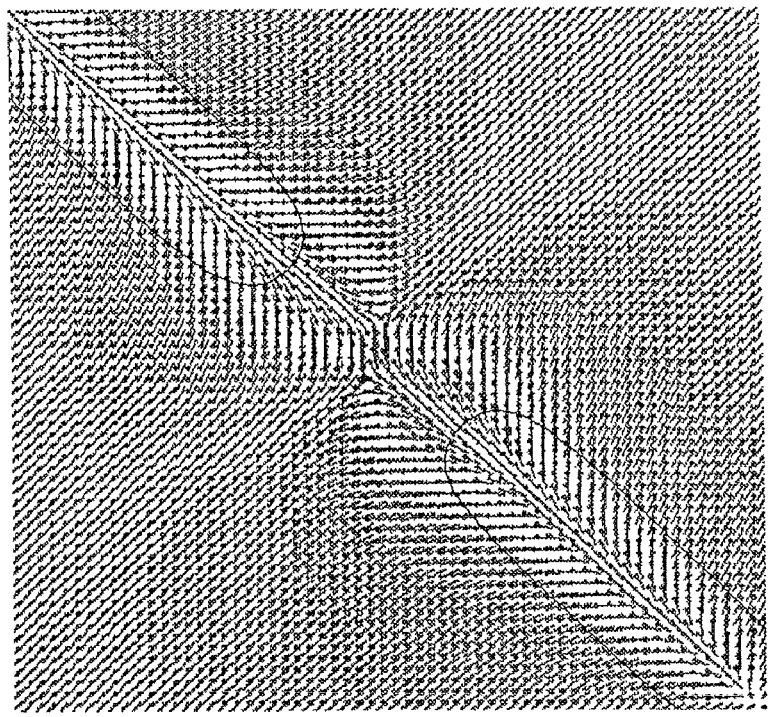
FIG. 17 is a view showing response characteristics of liquid crystal molecules in a liquid crystal display device in accordance with Embodiments 2 to 6 and is a view after 500 msec of voltage application.
Figure 17:
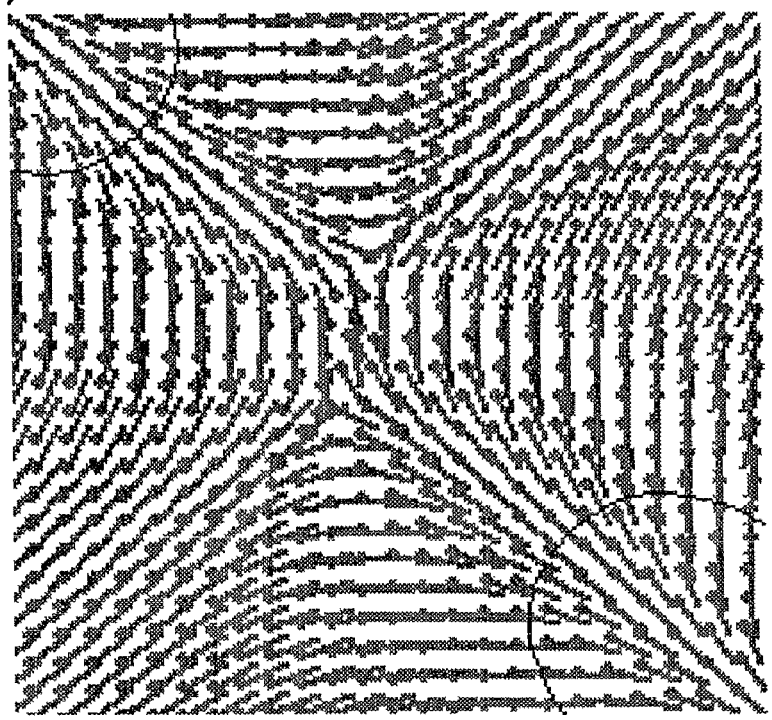
Figure 18:
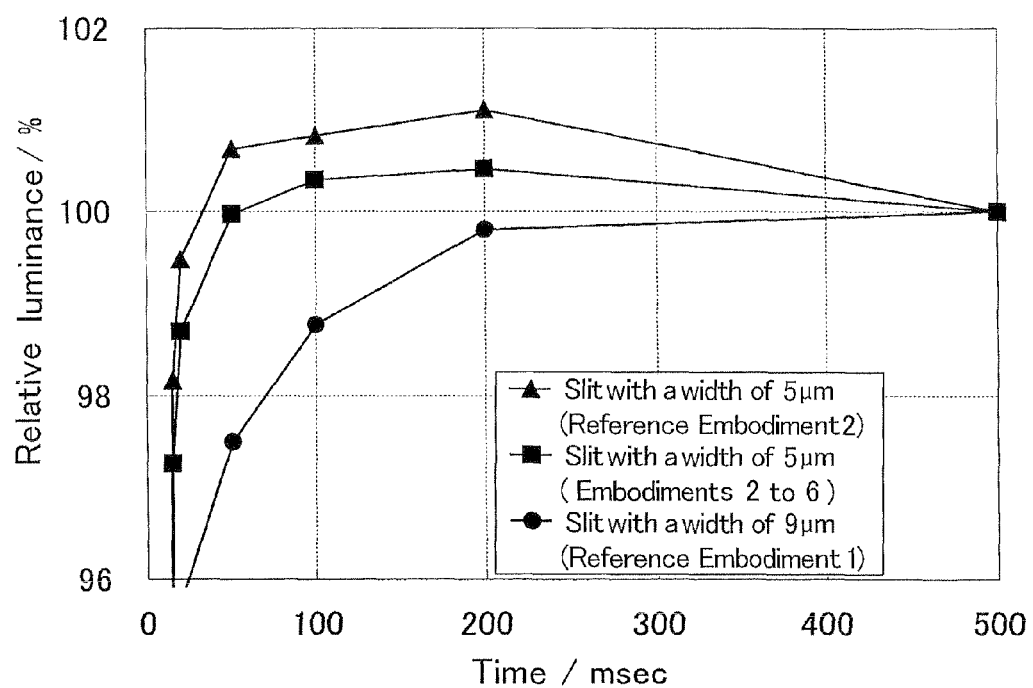
FIG. 18 is a graph showing a change in luminance with time in the liquid crystal display devices in accordance with Reference Embodiments 1 and 2, and Embodiments 2 to 6.

1: Array substrate
2: Color filter substrate
3: Liquid crystal layer
10: Corner portion of pixel electrode
11, 21: Glass substrate
12: Pixel driving line
13: TFT, Thin film transistor
14: Interlayer insulating film
14a: First interlayer insulating film
14b: Second interlayer insulating film
15: Pixel electrode
16: Contact hole
17: Slit
18: Corner light-shielding metal film (corner light-shielding member)
19: Conductive bridge
22: Color filter layer
23: Common electrode
24: Rib (dielectric protrusion)
31: Liquid crystal molecule
41: Gate line
42: Source line
43: CS line, storage capacitor line (main light-shielding member, corner light-shielding member)
44: Drain-drawing line (main light-shielding member, corner light-shielding member)

The invention claimed is:

1. A liquid crystal display device, comprising:
a pair of substrates; and
a liquid crystal layer disposed between the pair of substrates,
wherein one of the pair of substrates includes a pixel electrode having a rectangular shape when viewed from a display face side,
the other substrate includes a linear-shaped dielectric protrusion overlapping with a corner portion of the pixel electrode when viewed from the display face side, and
at least one of the pair of substrates includes a corner light-shielding member overlapping with a region where the linear-shaped dielectric protrusion and the corner portion of the pixel electrode overlap with each other.

2. The liquid crystal display device according to claim 1, wherein the corner light-shielding member reflects light incident from the display face.

3. The liquid crystal display device according to claim 1, wherein a width of the corner light-shielding member is larger than a width of the dielectric protrusion.

4. The liquid crystal display device according to claim 1, wherein at least one of the pair of substrates includes: a linear-shaped dielectric protrusion overlapping with a portion other than the corner portion of the pixel electrode; and a main light-shielding member overlapping with a region where the linear-shaped dielectric protrusion and the portion other than the corner portion of the pixel electrode overlap with each other.

5. The liquid crystal display device according to claim 4, wherein the main light-shielding member reflects light incident from the display face.

6. The liquid crystal display device according to claim 4, wherein a width of the main light-shielding member is larger than a width of the dielectric protrusion.

7. The liquid crystal display device according to claim wherein the main light-shielding member and the corner light-shielding member are constituted by a pixel driving line.

8. The liquid crystal display device according to claim 7, wherein the pixel driving line is a storage capacitor line.

9. The liquid crystal display device according to claim 7, wherein the pixel driving line is a drawing line extended from a thin film transistor.

10. The liquid crystal display device according to claim 7, wherein the main light-shielding member and the corner light-shielding member are electrically connected to each other through a conductive bridge.

11. The liquid crystal display device according to claim 10, wherein the pixel electrode is provided with a linear-shaped slit when viewed from the display face side,
the main light-shielding member and the corner light-shielding member are provided in the substrate including the pixel electrode,
the conductive bridge and the pixel electrode are disposed in different layers with an interlayer insulating film therebetween, and
the conductive bridge extends across the linear-shaped slit.

12. The liquid crystal display device according to claim 11, wherein the conductive bridge extends across a middle portion of the linear-shaped slit.

13. A liquid crystal display device, comprising:
a pair of substrates;
a liquid crystal layer disposed between the pair of substrates; and
a conductive bridge,
wherein one of the pair of substrates includes a pixel electrode provided with a linear-shaped slit when viewed from a display face side,
the conductive bridge and the pixel electrode are disposed in different layers with an interlayer insulating film therebetween, and
the conductive bridge extends across the linear-shaped slit.

14. The liquid crystal display device according to claim 13, wherein the conductive bridge extends across a middle portion of the linear-shaped slit.

* * * * *